US008161027B2

(12) United States Patent
DeShan et al.

(10) Patent No.: US 8,161,027 B2
(45) Date of Patent: Apr. 17, 2012

(54) METHOD AND SYSTEM FOR MANAGING DIGITAL CONTENT INCLUDING STREAMING MEDIA

(75) Inventors: Jay Brent DeShan, McKinney, TX (US); Chad Ric Gray, Plano, TX (US); Huong Thi Do, Lewisville, TX (US)

(73) Assignee: Yahoo! Inc., Sunnyvale, CA (US)

( * ) Notice: Subject to any disclaimer, the term of this patent is extended or adjusted under 35 U.S.C. 154(b) by 440 days.

(21) Appl. No.: 12/201,318

(22) Filed: Aug. 29, 2008

(65) Prior Publication Data
US 2008/0319953 A1 Dec. 25, 2008

(51) Int. Cl.
*G06F 7/00* (2006.01)

(52) U.S. Cl. .................... 707/706; 707/758

(58) Field of Classification Search .............. 707/706, 707/758
See application file for complete search history.

(56) References Cited

U.S. PATENT DOCUMENTS

| | | | | |
|---|---|---|---|---|
| 4,530,095 A * | 7/1985 | Ryan | | 714/801 |
| 5,969,716 A * | 10/1999 | Davis et al. | | 715/726 |
| 6,128,655 A * | 10/2000 | Fields et al. | | 709/219 |
| 6,226,618 B1 * | 5/2001 | Downs et al. | | 705/51 |
| 6,286,043 B1 * | 9/2001 | Cuomo et al. | | 709/223 |
| 7,039,594 B1 * | 5/2006 | Gersting | | 705/7.27 |
| 2002/0023164 A1 * | 2/2002 | Lahr | | 709/231 |
| 2002/0026581 A1 * | 2/2002 | Matsuyama et al. | | 713/168 |
| 2002/0026582 A1 * | 2/2002 | Futamura et al. | | 713/170 |
| 2002/0040366 A1 * | 4/2002 | Lahr | | 707/101 |
| 2002/0052849 A1 * | 5/2002 | McCutchen et al. | | 705/59 |
| 2002/0059364 A1 * | 5/2002 | Coulthard et al. | | 709/203 |
| 2002/0120577 A1 * | 8/2002 | Hans et al. | | 705/59 |
| 2002/0147840 A1 * | 10/2002 | Mutton et al. | | 709/239 |
| 2003/0070167 A1 * | 4/2003 | Holtz et al. | | 725/32 |
| 2003/0093799 A1 * | 5/2003 | Kauffman et al. | | 725/86 |
| 2003/0135464 A1 * | 7/2003 | Mourad et al. | | 705/50 |
| 2003/0152904 A1 * | 8/2003 | Doty, Jr. | | 434/350 |
| 2003/0163684 A1 * | 8/2003 | Fransdonk | | 713/153 |
| 2004/0068532 A1 * | 4/2004 | Dewing et al. | | 709/200 |
| 2004/0133597 A1 * | 7/2004 | Fano et al. | | 707/104.1 |
| 2004/0181753 A1 * | 9/2004 | Michaelides | | 715/523 |
| 2004/0254887 A1 * | 12/2004 | Jacoby | | 705/52 |

FOREIGN PATENT DOCUMENTS

| WO | WO 00/48375 | 8/2000 |
|---|---|---|
| WO | WO 02/057943 | 7/2002 |

OTHER PUBLICATIONS

International Search Report (PCT/US05/05814) dated Jul. 17, 2008.

* cited by examiner

*Primary Examiner* — Hanh Thai
*Assistant Examiner* — Michael Le
(74) *Attorney, Agent, or Firm* — James J. DeCarlo; Greenberg Traurig, LLP

(57) ABSTRACT

The present invention describes a system and method of managing digital content received from content providers and for facilitating access to the digital content to many subscribers. The method includes receiving from the content providers incoming feed files where each feed file contains information describing the content. The method determines if the feed files are approved by applying a template to the feed files and also receives request files from the subscribers where each request file contains search criteria. The method provides one or more answer files in response to the request files where each answer file identifies feed files that meet the search criteria of a corresponding request file. The answer files are used to access or permit access to digital content on the web. In addition, a graphical user interface is described to manage, edit, promote and delete the feed files provided to the system.

20 Claims, 21 Drawing Sheets

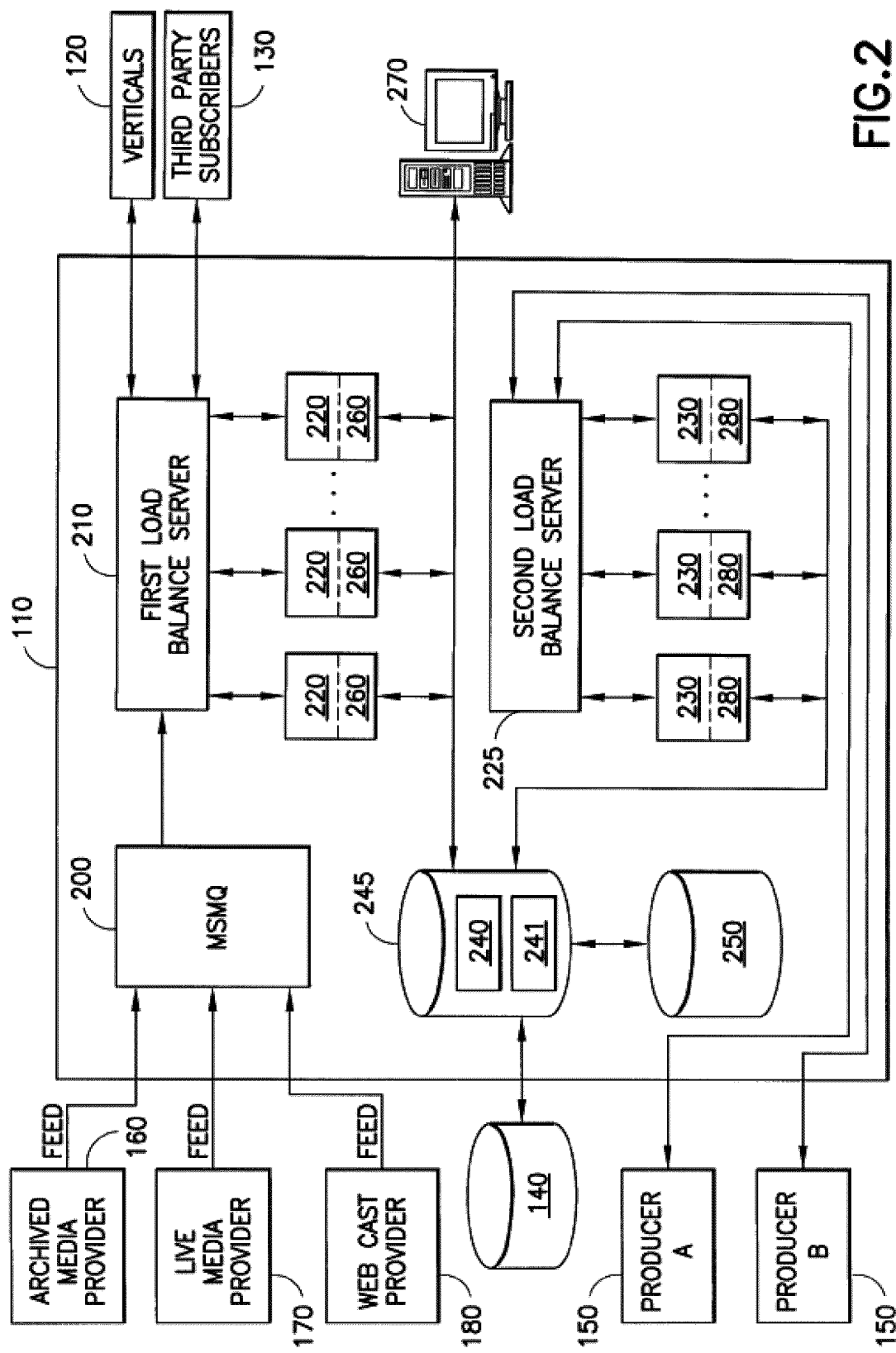

```xml
<NODE xml_id="" SPACEID="" TREEID="" STATUS="" FEED_PROVIDER="" FEED_ID=""
CONTENT_PROVIDER_PLAYER="on" REGISTRATION="on" ARCHIVE="on"
SORT ORDER="" RESTRICTION="on" TYPE="" nodetype="">
    <CATEGORY PATH=""/>
    <ASSIGNEE NAME="" EMAIL=""/>
    <FEATURED DESCRIPTION="" IMAGE_URL="" IMAGE_CAPTION=""/>
    <SHOPPING ORDER_BUTTON="" ORDER_URL="" ORDER_COMMENT=""/>
    <DATA IMAGE_URL="" IMAGE_CAPTION="" DESCRIPTION=""/>
    <URL LOCATION=""/>
    <LAST_EDIT EMAIL="" USER="" DATE=""/>
    <CREATED EMAIL="" USER="" DATE=""/>
    <OBJECT_TYPE ></OBJECT_TYPE>
    <TITLE ></TITLE>
    <TITLE2 ></TITLE2>
    <TITLE3 ></TITLE3>
    <DESCRIPTION></DESCRIPTION>
    <NOTES ></NOTES>
    <CONTACT NAME="" EMAIL=""/>
    <TICKER ></TICKER>
    <SEASONALITY></SEASONALITY>
    <REGEXP EVENT="" PUBLISH=""/>
    <PUBLISH START="" END="" TZ=""/>
    <EVENT_TIME START="" END="" TZ=""/>
    <KEYWORDS ></KEYWORDS>
    <COST ></COST>
    <SPORTS_TICKER></SPORTS_TICKER>
    <LOCATION ></LOCATION>
    <ATTRIBUTES LEAF="on" HIDDEN="on" EMBEDDED="on" CLIENT="on" ON DEMAND="on"/>
    <PLAYER FORMAT="" SPEED=""/>
    <MEDIA AUDIO="" CHAT="" VIDEO=""/>
    <PROVIDER NAME="" URL=""/>
    <ALTERNATE_URL></ALTERNATE_URL>
    <STREAM ID="" SEGMENT="" FORMAT="" CLIP="" SPEED="" MEDIA_INFO="">
        <PLAYLIST ID="" SEGMENT="" FORMAT="" SPEED="" MEDIA_INFO=""/>
    <LINK TITLE="" URL="" DESCRIPTION=""/>
    <IMAGE TITLE="" TYPE="" SIZE="" HEIGHT="" WIDTH="" YIMGURL="" ID=""/>
    <CHANNEL ></CHANNEL>
    <PROPERTY></PROPERTY>
    <BROWSE_FRAME_URL ></BROWSE_FRAME_URL>
</NODE>
```

FIG.3

```
<REQUEST type =" queryxmltext "><WHERE></WHERE></REQUEST>
    WHERE clause can contain:
    a. For attributes
    <PARENT_NAME ATTRIBUTE_NAME=" value " OPERAND="operand "/> b. For elements
    <ELEMENT_NAME OPERAND="operand "> value </ELEMENT_NAME>
```

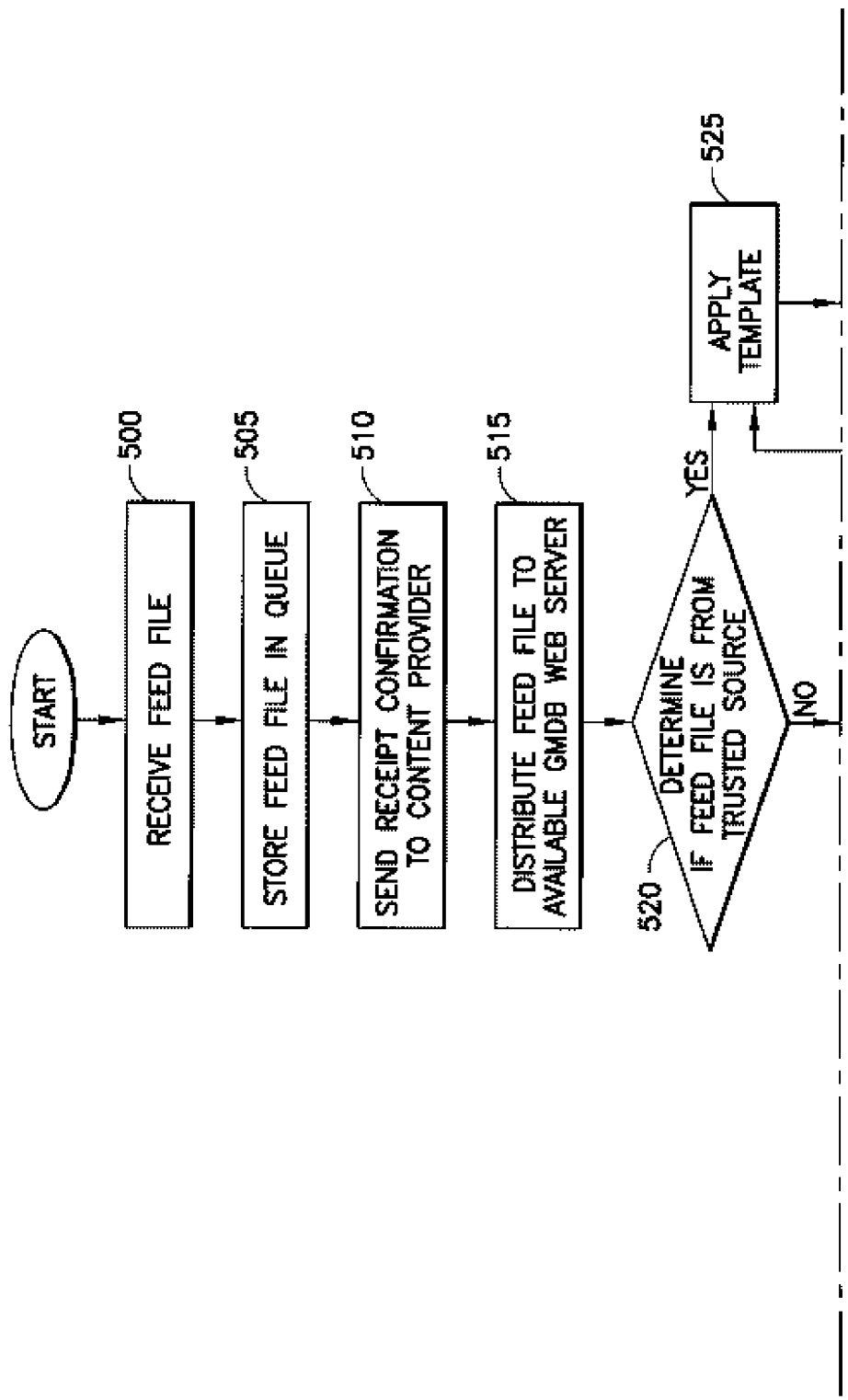

METHOD AND SYSTEM FOR MANAGING DIGITAL CONTENT INCLUDING STREAMING MEDIA

CROSS REFERENCE TO RELATED APPLICATIONS

This application claims the priority from co-pending U.S. patent application Ser. No. 10/789,722, filed Feb. 27, 2004, entitled METHOD AND SYSTEM FOR MANAGING DIGITAL CONTENT INCLUDING STREAMING MEDIA.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The present invention relates generally to a method and system for managing digital content and more particularly to a method and system for managing, promoting and delivering digital content, including streaming media.

2. Description of Related Art

With the advent of the Internet, the World Wide Web, and advances in achieving ever increasing, affordable bandwidth, an industry has developed around the delivery of digital content, especially streaming media content. By way of example, streaming media may be used for any of a number of purposes, including entertainment, distance learning and corporate purposes. Entertainment companies stream movies, music and sporting events, distance learning companies stream educational content, and corporations stream training materials, presentations and commercials.

Although some streaming media content providers may have relatively few items of content to provide, some content providers have hundreds, even thousands of content files. Storing and streaming this number of content files can be costly. Furthermore, streaming content requires a level of technical expertise often not found in companies focusing on creating content. Consequently, content creators and providers have turned to service providers to store and stream content on behalf of the content providers.

As more content providers turn to service providers for their streaming technology needs, service providers must manage more client accounts and greater numbers of content files. Furthermore, to maintain existing content provider clients and attract new clients, service providers must provide a content management system that not only is capable of organizing large numbers of content files, but also is easy for the content providers to use.

As service providers start creating and owning their own content, the service providers face an even greater challenge, namely, the need to sort the vast number of incoming streams both originating from third parties and those internally created or controlled. In addition, efficiently linking, updating and promoting the digital content is important given the speed with which internet users are accustomed to receiving content. As service providers start creating their own content, they are responsible for promoting this content by making it known and available to their users.

Accordingly, there remains a need for a system and method to efficiently link, manage and promote digital content, including streaming media.

SUMMARY OF THE INVENTION

Certain embodiments of the present invention solve the foregoing and other needs. In an embodiment, a method and system is provided for allowing a producer to link, manage, make accessible and/or deliver to users streaming media and other digital content, as well as descriptive information concerning the digital content, received from one or more content providers. A system according to an embodiment of the present invention couples one or more media content providers to at least one Global Media Database system ("GMDB"). The content providers submit a feed file to the GMDB that contains descriptive information, which can be used to describe, locate and/or play one or more pieces of digital content. The digital content may relate to an event such as a sporting event, entertainment event (e.g., show, concert), education event (e.g., lecture, conference) or any other subject matter. In addition, the event may relate to any number and type of digital content such as a text file, software files, video games, image files, movie files, audio files and the like in any computer readable format. In an additional embodiment, for example, where the event relates to only one piece of digital content, the event and digital content could be synonymous.

A producer may determine whether to permit or authorize access to the event referred to in the feed file. The feed file may include identifying information for one or more data streams or items of content of the same event broadcast in a variety of media formats and data transfer rates. In addition to the information contained in the feed file, the producer can add additional descriptive information to the feed file to more accurately describe the event and/or its content. In certain embodiments, the feed file does not contain the actual digital content, but only descriptive information to access, identify and/or describe the digital content of the event. In an alternate embodiment, however, the feed file may contain the actual digital content, with or without the descriptive information.

According to an alternate embodiment, the system may apply one or more templates to the feed file to determine if the descriptive information contained in the feed file is complete. Certain feed files that contain predetermined information can be stored in the system without the assistance of the producer.

The system according to another embodiment allows a producer to search the Internet or other network for free, reusable content (often referred to in the e-commerce vernacular as "free surfing" the Internet), find desired digital content, link the digital content and/or descriptive information to the system and promote the content to thereby authorize use by subscribers and related subscribers, such as, various producers from verticals or other Internet properties, for example, in the case of Yahoo! Inc. being the producer, Y! news, Y!movies, Y! sports, Y! personals, Y! UK shopping, and Y! platinum, etc.

In addition, an additional embodiment includes a graphical user interface to manage, edit, promote and delete the feed files provided to the system.

In yet another embodiment, subscribers, including various verticals, can send a request file to the system for feed files that match required search criteria. In another embodiment, the request file could request all new or updated feed files. Once the system receives a request file, the system generates an answer file containing one or more feed files and forwards the answer file to the subscriber. The subscriber is then able to access or permit others to access the requested content.

BRIEF DESCRIPTION OF THE DRAWINGS

These and other features of the present invention will become apparent from the following detailed description considered in connection with the accompanying drawings, which are attached hereto and form a part hereof. It should be understood, however, that the drawings are designed for the purpose of illustration only and not as a definition of the limits of the invention.

In the drawings, wherein similar reference characters denote similar elements throughout the several views:

FIG. 2 is a schematic diagram of a global media database system according to FIG. 1;

FIG. 3 is a textual representation of the XML tags for a feed file according to one embodiment of the present invention;

FIG. 4 is a textual representation of a request file according to one embodiment of the present invention;

FIG. 5a is a flow chart illustrating the process according to an embodiment of the present invention;

FIG. 5b is a continuation of FIG. 5a;

DETAILED DESCRIPTION OF CERTAIN EMBODIMENTS

Figure 1:
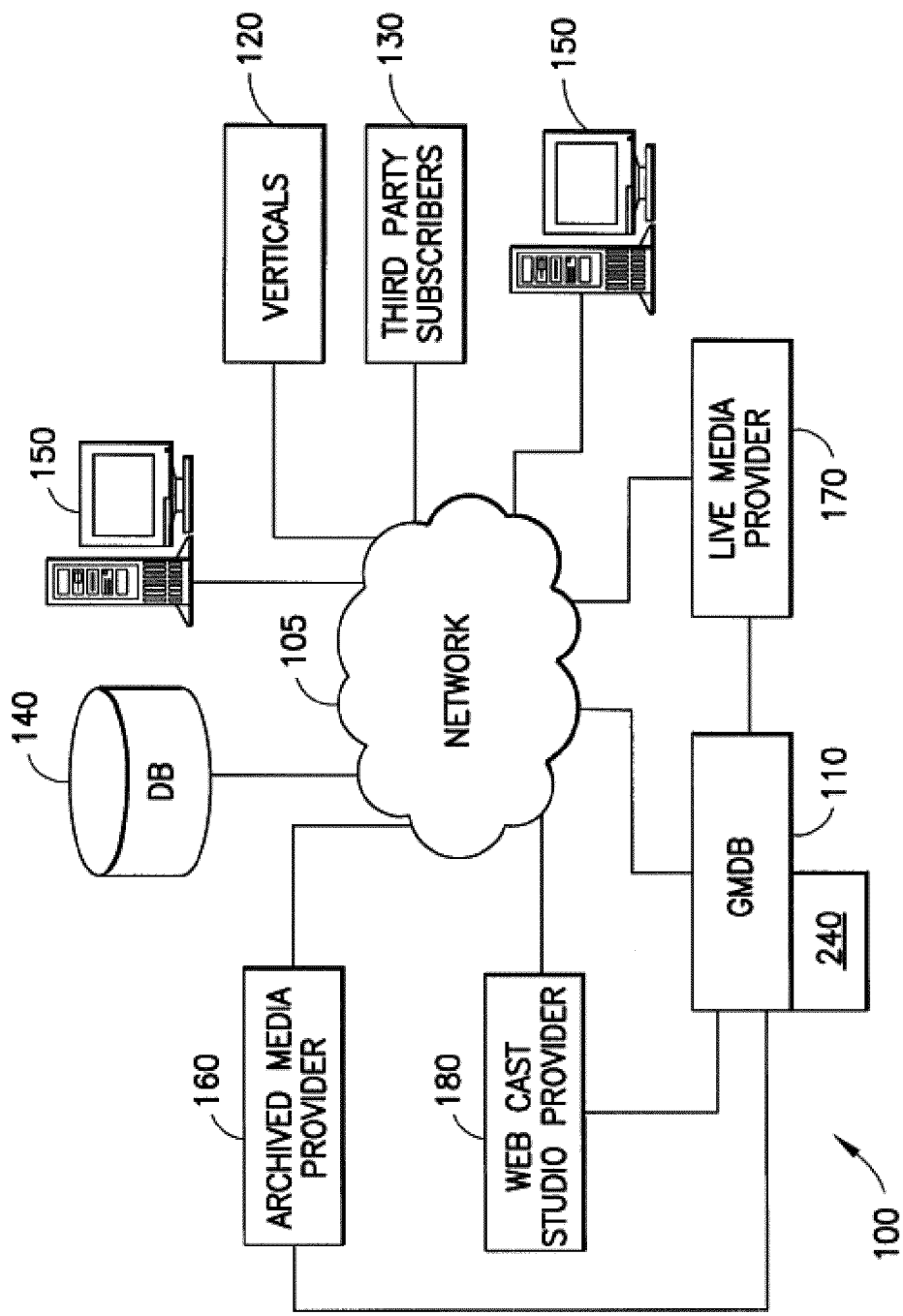
FIG. 1 is a schematic illustrating the system architecture of one embodiment of the present invention.

Certain embodiments of the present invention will now be discussed with reference to the aforementioned figures. Turning first to the schematic of FIG. 1, a system 100 according to one embodiment of the present invention is shown. In general, the system 100 allows any number or type of media providers, such as an archived media provider 160, a web cast studio provider 180, and a live media provider 170 or any other content provider (collectively "content providers"), to submit one or more feed files identifying digital content, including, for example, streaming media content, to a global media database 110 system (GMDB). In one embodiment, the feed file does not contain the actual digital content but contains descriptive information and other information necessary to access the event. The feed file may be a file in any format, including, for example XML. In this embodiment, the GMDB 310 stores feed files containing descriptive information for each event. The actual digital content is stored elsewhere and is locatable using the descriptive information contained in the feed files. In alternate embodiments, the actual digital content can be stored in storage device 245 within the GMDB 110, within a storage device at the content providers or in a storage device from a third party, such as America Online ("AOL").

Archived media provider 160 provides previously recorded digital data such as digital still images, text files or streaming media files that have been stored on provider 160. Web cast studio provider 180 may include a streaming media provider that broadcasts events such as a taped educational seminar, etc. Live media providers 170 provide live video coverage of an event and broadcast the information using a network 105. For example, broadcasting a live sporting event may utilize a camera connected to a computer where the computer receives digital data from the camera and transmits the digital data to GMDB 110. The data is typically transmitted using a satellite dish as most remote locations do not have a high speed connection to a network 105, however, any suitable transmission method may be utilized. In an alternate embodiment of the invention, the video camera is connected to an encoder and the encoder interfaces the camera with a streaming server that broadcasts the live video feed to many users. Network 105 interconnects archived media provider 160, web cast studio provider 180, live media provider 170 and GMDB 110. The content providers, GMBD 110, Verticals 120 and subscribers 130 may be coupled to network 105 by any one of a number of known manners, including but not limited to dial up modems, digital subscriber lines ("DSL"), cable modems or wireless devices such as Bluetooth or a Wi-Fi 802.11 network interface. Network 105 may be any network including, for example, a local area network, a wide area network, the Internet or a corporate or government intranet or combination thereof. In addition, there may be direct connections between each of the content providers and the GMDB 110. Any method known or yet to be developed may function as network 105, including connections using conventional cables, fiber optic cable, satellite dishes, wireless transceivers and the like.

It is understood that although the embodiments described herein are generally discussed in the context of streaming media, the embodiments, and the present invention, are equally applicable to other types of digital content, for example, digital still images, text files, software programs, audio files, and any other type and format.

System 100 permits a plurality of users that operate web sites in different vertical markets 120 (referred to in the e-commerce vernacular and herein as "verticals") and one or more subscribers 130, (collectively referred to as "subscribers"), connected to network 105, to submit a request file for streaming media data to GMDB 110. The request file queries GMDB 110 by submitting one or more search criteria corresponding to the desired streaming media, or other digital content, or event. An answer file containing one or more feed files corresponding to the search criteria is returned to the subscribers and permits the subscribers to link to the digital content identified in the feed file, or in an alternative embodiment, actually contained in the feed file.

The information stored in GMDB 110 for each feed file may be stored in an offsite storage device 140 connected to network 105 or in a database 240 contained in an internal storage device 245. Verticals 120 present links on their web page to digital content, including streaming media, that are created by content providers and requested from the GMDB 110. In addition, content which is added to the GMDB 110 by a producer 150 may also further enhance the respective verticals 120. Producers 150 are generally employed by the provider of system 100 and are responsible in part for maintaining the integrity of GMDB 110. Producers 150 screen the feed files that are submitted to GMDB 110 and determine which feed files require additional descriptive information and which feed files relating to an event are authorized to be stored in GMDB 110 and promoted. In the present embodiment, the GMDB 110 stores feed files containing descriptive information for each event. The actual digital content is stored elsewhere and is locatable using the descriptive information contained in the feed files. In alternate embodiments, the actual digital content can be stored in storage device 245 within the GMDB 110, within a storage device at the content providers, in a storage device from a third party, such as America Online ("AOL") or elsewhere. The content providers, GMBD 110, Verticals 120 and subscribers 130 may be coupled to network 105 by any one of a number of known manners, including but not limited to dial up modems, digital subscriber lines ("DSL"), cable modems or wireless devices such as Bluetooth or a Wi-Fi 802.11 network interface.

Whenever GMDB 110 receives new or updated feed files or modifications to existing feed files from the content providers, one or more producers 150, connected to network 105 may examine the feed file and determine whether or not to add additional descriptive information to the feed file, store the feed file in the GMDB 110 or discard the feed file.

Turning now to FIG. 2, there is shown a schematic of the exemplary GMDB 110 of FIG. 1. Feed files are provided by content providers and stored in a queue 200. Queue 200 stores each feed file and provides a confirmation of receipt to the respective content provider. Next, a first load balance server (or other processor) 210 ingests the feed files from queue 200 and determines which of a plurality of GMDB web servers 220 is best able to process the feed file.

The load balance server 210 may have a virtual IP address that points at a list of real IP addresses for each server 220 and assigns the feeds to the most available server 220 as determined by a load-balancing method.

Examples of load-balancing methods include: Least connections (weighting optional)—requests for new connections are forwarded to the server with the fewest active connections; Round robin (weighting optional)—new connection requests are forwarded to real servers in round robin fashion; and Hashing—the source IP address is used to compute an index into a table that references all servers so all requests from a user are sent to the same server (most useful in e-commerce applications). The weighting option may assign a weight to each server to establish a priority amongst the servers. A server with a higher weight may be chosen over a server with a lower weight even if there are more connections to the former. This option is useful if one server is more capable than the other server. There is little to no risk of overworking the first server as a maximum connections option limits the active connections assigned to a server. When a server reaches this threshold, it receives no more connections until it drops below its limit. Overflow servers can be called into action when this limit is met. While the server 210 is described as a server, it is understood that the function of first load balance server 210 in an alternate embodiment, may be implemented using a switch.

Each server 220 contains at least a processor 260 for performing various system functions including processing of incoming feed files, processing of an incoming request file requesting digital content, providing an answer file containing the requested digital content, and applying a template to the feed files among other functions. GMDB web servers 220 may also assist in or perform authentication and billing functions by accessing an authentication billing server 270.

The billing functions could include imposing an access fee for each content provider and each subscriber whenever they access the GMDB system or impose a flat fee for unlimited use. In an alternate embodiment, the GMDB system may be used as a clearinghouse for pay-per-view content. For example, the system could impose a fee whenever feed files are submitted to the system and promote the feed file (i.e., content) in proportion to the amount of fee paid. In addition, subscribers could be charged a fee for requesting new or updated content and receive the content on a sliding degree of priority depending upon what fee is paid. Also, the system provider could require a portion of the fee charged by the content providers to the subscribers for accessing the content.

Once processor 260 determines that the feed file is from a trusted source of content or from an authorized source, processor 260 applies a template to determine if the feed file is complete and should be authorized. If so, the feed file is stored in database 240. If not, the feed file is stored in a temporary queue 241 to await further processing by the producers 150. Alternatively, a message is generated to the content provider identifying the necessary information and/or changes. GMDB web servers 220 store the feed files, for example, in database 240, queue 241, a backup storage device 250 or offsite storage device 140. A trusted source of content may include a provider that submits feed files that are prescreened for content, contain a minimum amount of descriptive information, and have billing information previously established. In addition, content from an authorized source is content that does not come from a trusted source but does come from a source that has billing information previously established.

Producers 150 access temporary queue 241 through a second load balance server (or other processor) 225 and may add additional descriptive information to the feed files. In one embodiment, the feed files contain a plurality of data fields or "elements" associated with each piece of descriptive information. Each element may contain tags which further define the elements.

The second load balance server 225 determines which one of a plurality of GMDB manager servers 230 is best able to service the Producer 150. Like server 210, server 225 may select which GMDB manager server 230 to distribute the feed file to using a load-balancing method such as: Least connections (weighting optional), Round robin (weighting optional), or Hashing. In an alternate embodiment, the functionality of server 225 may also be implemented using a switch. It is understood that an alternate embodiment of the present invention includes only one GMDB web server 220 and only one GMDB manager server 230, thus obviating the need for the first load balance server 210 and the second load balance server 225, which are optional. The addition of more than one server 220 and 230 and the addition of servers 210 and 225 increase the capacity of the system and add fault tolerance capabilities.

Although not depicted in the figures, the servers described herein generally include such other art recognized components as are ordinarily found in server systems, including but not limited to CPUs, RAM, ROM, memory, clocks, hardware drivers, interfaces, and the like. The servers are preferably configured using the Windows® NT/2000, UNIX or Sun Solaris operating systems, although one skilled in the art will recognize that the particular configuration of the servers is not critical to the present invention and may be changed as a matter of design choice. Furthermore, different tasks, illustrated herein as being performed on separate and distinct servers, may, in some embodiments, be performed on the same server. Conversely, individual tasks, illustrated herein as being performed on a single server, may be distributed among several servers. Thus, in the present embodiment, processor 260 in web server 220 or a manager processor 280 in manager server 230 can be configured to perform program logic stored on a computer readable medium. As such, the program logic may be designed to implement the process described in the description of certain embodiments and accompanying claims.

Referring now to FIG. 3, there is shown an exemplary description of a feed file 300 used to describe an event and/or the content associated therewith. In the present embodiment, the file is an XML document although other formats can be used (e.g., HTTP, HTTPS, etc.). Feed file 300 is used whenever content providers 160, 170 or 180 wish to link an event to GMDB 110. While feed file 300 is an example of a complete feed file made up of multiple elements, it is understood that certain events will not have all of the elements listed, may include fewer or additional elements without departing from the spirit and scope of the invention. Some elements may also include fewer or additional tags to provide less or more information for the element. A brief description of each element in FIG. 3 follows below.

The NODE element contains several tags that generally identifies and describes the event and the feed file provider. Each feed file submitted to GMDB 110 contains a FEED_PROVIDER and a unique FEED_ID tag which are used in conjunction to identify events in GMDB 110. In the present embodiment, the FEED_ID tag is unique for each FEED_PROVIDER. In an alternate embodiment, a single tag could be used that is unique for every event submitted to the GMDB 110. Additional tags are used to describe the content associated with the event and/or the characteristics of the material referenced in the feed file. Additional tags include an XML_ID which is the identification number for this feed file in an XML database. The XML database stores all of the XML_ID numbers and this tag is assigned a unique ID once the feed file is approved. In an alternate embodiment, the XML_ID tag is assigned a unique ID upon submission to GMDB 110. The XML database may also store additional information about each XML_ID such as, for example, one or more tags referred to in FIG. 3.

The tag SPACEID is the identification number in Hotlist, where Hotlist is a tool used to place content into a hierarchy data structure. The hierarchy is comprised of different top level categories and sub-categories of content represented in the GMDB. For example, a "sports" category includes subcategories, such as baseball, football, basketball, etc., which, in turn, may include a lower level sub-category, such as, Yankees, Giants, etc. The TREEID is the identification number of the tree in the Hotlist. This value helps locate the digital content in the Hotlist and may refer to a category or sub-category.

Next, the STATUS tag indicates the status of the event. The present embodiment includes three status values: (1) hotlisted (also referred to as approved) indicating that the feed file describing the event has been approved or authorized either by a producer or automatically by a template because the feed file contains a minimum amount of descriptive information, therefore, the feed file will be listed in the GMDB; (2) updated, indicating that the feed file describing the event has updated information about the event, for example, a new description of the event or a new start day and time or other change. (In this embodiment, updates need to be approved before they show up in the GMDB); and (3) new, indicating that the feed file describing the event has not been approved and will not be listed on the site until the feed file has been approved.

The tag FEED_PROVIDER indicates the source of the feed file, for example, the specific content provider 160, 170, or 180 that provided the feed file. In accordance with an embodiment of the invention, the GMDB 110 permits a producer to manually surf the web in search of new content to add to the GMDB 110. If a producer finds an event or content on the web and manually enters a feed file describing the event or content in the GMDB, then the feed file's FEED_PROVIDER tag value is "free_surf".

Tag FEED_ID contains a unique value used to identify the event corresponding to the feed. Because it is generated by the source of the event, this feed ID is unique only among events from the same source. Therefore, in the present embodiment, FEED_PROVIDER and FEED_ID are used in conjunction to identify events in GMDB 110 although in alternate embodiments, each FEED_ID is unique across all sources or providers.

The tag CONTENT_PROVIDER_PLAYER having a value equal to "on" indicates that the content provider created this content and that a proprietary player may be required. This attribute will not be present if the event does not require a proprietary player from the content provider. In addition, if a subscriber lists the content identified in the feed file on their web page, an icon is displayed next to the content whereby clicking on the icon spawns an embedded player. Occasionally, the event referenced in the feed file provided by a content provider requires registration to the content provider's website in order to access the event. This may occur, for example, if the event requires the user to register or "log in" to the site in order to access the digital content (e.g., a pay-per-view event) Thus, the tag REGISTRATION indicates whether registration is required ("ON") or not required ("OFF") in order to play this event. This attribute need not be present if the event does not require registration.

An ARCHIVE tag indicates whether an archive of the event is available to users ("ON") or is unavailable ("OFF"). Each event may be stored for a set time period so that users may view the event outside of a scheduled viewing period. This attribute need not be present if the archive is not available.

Tag SORT ORDER indicates where the item appears in a list on the list of events on the user's webpage. The default value is 100 although other values can be used. In the present embodiment, the lower the number, the higher it appears on the website. For example, an event with a sort order of 45 will appear above an event with a sort order of 100. This tag permits producers 150 to give preferential treatment to one event over the other. For example, the broadcast of breaking news could be listed closer to the top of a list and therefore more visible than an older news story. Similarly, in an alternate embodiment, content providers may pay a premium to have their content listed closer to the top then some providers not paying the premium.

The tag RESTRICTION indicates that there are limitations on where this content is available for viewing if the tag is set to ("ON"). For example, certain events can be played in the United States and are prohibited from being played outside the United States. Likewise, certain video clips are permitted to play in Europe and not in the United States. These restrictions, for example, may be based on the content of the event or on the relevance of an event to a particular geographic region. The producers 150 determine if there are any restrictions on the event and set the tag accordingly.

The next tag, TYPE, generally describes what type of entry in the Hotlist hierarchy the particular event is. The TYPE tag may contain values such as "category", "leaf", "category leaf", and "data window". A value equal to "category" is used to add a new category into the Hotlist hierarchy and may contain additional lower level entries: leaf, category leaf, and/or data window, i.e. children. These types may be used, for example, when displaying events and/or content to subscribers and end users. For example, in an embodiment of the invention, a web page with a graphical user interface is presented to end users for the purpose of allowing them to navigate and view the content feed files and/or related data. Such interface may be a trisected web page having three side-by-side sections or panes—left, middle and right—and the categories and their children may appear on the left side of the web page under a category heading. This trisected web page presents links to digital content and is organized based on the tag TYPE. A value equal to "leaf" links to an event page directly and each leaf corresponds to a parent category, that is, if the user selects a sports story, the leaves would refer to additional sports stones. These leaf links may appear in the middle of the trisected page. A "leaf" type may be selected for pages that are added into the Hotlist hierarchy from free surfing and may also be selected when adding any internal content that does is not of the type Data Window, such as business services content, related news stories, financial data, and the like. Both Leaf and Data Window types are commonly found below Category type in the hierarchy. Next, a value equal to "category leaf," which contains children, is listed along with leaves in the middle of the page. Type Category Leaf is a combination of a category and a leaf and this type allow producers to add a new level to the hierarchy, without it actually displaying as a category. Selecting a category in the hotlist reveals additional sub-categories and leaves related to the category. Category leaf entries display like a leaf on the site, not as a category.

The ability to add a new level without it being a new category is useful if a specific event has multiple elements within it. For example, if there is content for the movie "The Matrix", a category leaf for "The Matrix" then would allow interviews with all of the actors, the soundtrack, and the trailer all to be surfed in under the movie as separate elements. Each item of content is thus searchable, but producers could also easily locate the group of content.

Lastly, a value of "data window" is part of the trisected web page. This may be listed along with leaves and an included link will launch the embedded player to play the content. Data windows provide all of the necessary information to a media player to launch the streaming media described by the data window. There may be multiple data windows on the trisected web page GUI example above. Each data window may contain an image, a description and a link to the selected media. Selecting, for example, the link launches a media player to view these linked digital content. It is understood that any content player can be used to play the content described by the data window. In addition, the player may also be a proprietary media player that is specifically configured to receive the information contained in the data window and access and play the desired content. It is also understood that the trisected example above could be described with reference to a single web page having one or more content types listed. While it is understood than any program could access GMDB 110 and present the information contained and referenced in FIG. 3 to the end user, an embodiment of the invention utilizes a program called MEDIAFRAME to present streaming media and other digital content to users. This program serves the function of retrieving the information from GMDB 110 as described in FIG. 3 and displaying the content to the end user. It is understood that FIG. 3 may contain additional information necessary to access and present digital content. MEDIAFRAME, is described in a U.S. patent application entitled "information Display Systems and Methods" which was assigned application Ser. No. 09/801,439 and filed on Mar. 7, 2001 and U.S. patent application entitled "System for Dynamic Generation of Online Streaming Media Advertisements" which was assigned application Ser. No. 09/773,943 and filed on Jan. 31, 2001. These applications are commonly owned by the assignee of the present invention and the entire contents of which are hereby incorporated by reference in their entirety.

The tag NODETYPE generally describes the type of feed files and may have the value "complete" or "update". A value of "complete" indicates that this is the actual event feed file and contains a minimum amount of descriptive information deemed necessary to identify the event and is thus approved. Such minimum amount of information can vary as a matter of design choice, for example, by the type of event, content provider, content or any other factor. A value of "update" indicates that the feed file holds the updates to a previously received, feed file. Occasionally, content providers resubmit a feed file with updated information such as, for example, a new start time or program description. The lags FEED_PROVIDER and FEED_ID are used to determine which update feed file corresponds to which previously received feed file and the corresponding values are updated. The updated feed file may contain all of the previous information or just the updated information. In addition, the feed file may contain the same XML_ID, (if provided to the content provider in, for example, the confirmation email) thereby facilitating the updating of the data in the feed file.

Continuing with the description of FIG. 3, the element CATEGORY contains a tag called PATH, which indicates the path the event is listed under on the site. The PATH is a link to the location that the feed file is stored in the Hotlist hierarchy. In an alternate embodiment, the PATH may refer to the actual digital content of the event, which may be stored in database 240 or external storage 140, or elsewhere.

Element ASSIGNEE contains several tags that generally describe the producer who is responsible for a particular event. NAME is the name of a producer who is responsible for the corresponding event, and EMAIL is the email address of the producer (Assignee). For example, if John Smith is the producer responsible for all sports feed files, then John Smith would be stored under NAME and his email address would be stored under EMAIL.

Element FEATURED contains several tags relating to whether this event is going to be featured on the trisected web page. The featured events appear higher up in a list of events and therefore are more visible to web users. As such, these featured events have more viewer "hits". Producers may determine the content and events that are to be featured based on any subjective or objective criteria (as with the hierarchy), including type of content or event and whether the content provider pays a premium for a featured listing. A tag called DESCRIPTION indicates the description that is used to describe the events that are being featured. Featured events are anything showing in the middle of the trisected page on the top level; these listings do not appear anywhere lower (i.e., less prominent) on the site. The tag IMAGE_URL (universal resource locator), is the image for the featured area, and IMAGE CAPTION is used to further identify the image or to identify the source of the image.

The SHOPPING element contains several tags relating to whether selected merchandise is available for purchase related to the event. CD's, clothing, household items, etc., are all examples of possible items for purchase. If tag ORDER BUTTON is checked, then a Shopping button appears on the trisected page and end users of the web page can purchase merchandise related to the selected event. Tag ORDER_URL is a link to a shopping site for the specific item. For example, if an end user is watching an interview of the music group "U2", the Shopping button links to U2 merchandise available at the Shopping site pointed to by the ORDER_URL information. Tag ORDER_COMMENT gives the end user additional information about what the shopping button is linking to. For example, it could say "Purchase U2 CD's". Notably, the provider of the GMDB system may have any number of financial arrangements, with the content provider and/or operators of the shopping site to receive revenue, including, number of page views, number of click-throughs, amount of sales and the like.

Element DATA contains several tags that generally describe the information that appears in the data window on the trisected page. In addition, the data window may be included on any webpage as a self contained subset of the webpage and display a related group of information about a particular event. Tag IMAGE URL is the URL for the image that is used on the data window and tag DATA contains the information that appears in the data window frame of an end user GUI, such as the trisected web page discussed above. IMAGE CAPTION is the caption that would be used, if any, and is displayed under the image. IMAGE CAPTION typically gives credit to the supplier of the image, i.e. AP, Reuters, etc, although it can be used for other purposes. Tag DESCRIPTION is the event description that appears in the data window.

Element URL includes the tag LOCATION, which identifies the location (e.g., server or server and sub domain and the like) where the digital content of the event is stored. It is understood that the URL may refer to one location having multiple content files which could be requested individually by specifying the media type and transfer rate and appending this information to the LOCATION tag. In an alternate embodiment, the STREAMED could be used alone or in conjunction with LOCATION to specify where a particular piece of content is located.

Element LAST_EDIT contains several tags that are used to identify the producer who last edited the feed file. Tag EMAIL is the email address of the producer who last edited the feed file and USER is the name of the producer who last edited the feed file. The tag DATE indicates the time the feed file was last edited.

Element CREATED contains several tags that are used to identify the producer who created the feed file. Tag EMAIL identifies the email address of the producer who created the feed file listing, and USER is the name of producer who created the feed file listing. The tag DATE is the time the feed file was created.

Element OBJECT_TYPE is used to indicate that the event should be listed as an ad module on the tri-sectored webpage. This field can be set with any predetermined value to indicate that the event is an ad module. Ad modules may appear anywhere on the end user interface, including the trisected window, discussed above, as dictated by the code of the window.

Element TITLE is the title of the event and serves as the Data Window Title if a tag TITLE2 is empty. TITLE2 is the main title in the data window, and TITLE3 is a subtitle in the data window. Element DESCRIPTION contains a description of the event and appears on the listing pages on the site. NOTES is a field for notes for GMDB producers and will not publish on the site.

Element CONTACT contains several tags, including NAME and EMAIL, which are used to contact the client (e.g., content provider) submitting the feed file. The element TICKER indicates a company's ticker symbol (if publicly traded) and facilitates looking up the company's financials.

Element SEASONALITY indicates the month(s) of the year during which an event takes place. This tag is used, for example, by the Sports vertical 120 (football season, basketball season, etc.). The format of the tag value may take any number of forms including "m=[start month]–[end month]", where the start month and end month are numerical values indicating the month of the calendar, such as: "m=08-12".

Element REGEXP contains several tags that are generally used to indicate the actual time that the event is broadcasted and the total time that the event will be available for viewing. If an event is available live and also accessible via an archive of the event, the total time the event is available is the combination of the actual time plus the archive time and is therefore longer than the actual time the event is broadcasted. Tag EVENT is the event time string that holds the time that the event actually occurs. Tag PUBLISH is the publish time string that holds the total period that the event is to appear on the site. Tag START is the publish start time and END is the publish end time. The format of the START and END tags may take any number of forms including the following format: "mm/dd/yyyy hh:mm", where "mm" is the month, "dd" is the day, "yyyy" is the 4 digit year, "hh" is the hour in 24-hour format, and "mm" represents the minutes. TZ is the time zone of publish start and end times where valid values are: central time ("ct"), eastern time ("et"), mountain time ("mt"), and pacific time ("pt"). For the sake of simplicity, the time zones referred to throughout this application correspond to the time zones for the United States of America, however, it is understood that the various expressions may include any time zone in any format.

The element EVENT_TIME contains several tags and is the time that the event occurs. Tag START is the event start time and END is the event end time. Both the START and END time may take any number of forms including the following format: "mm/dd/yyyy hh:mm". It is understood that the format may also include the time in 12-hour format with a separate entry indicating AM or PM. TZ is the time zone of event start and end times where values are: central time ("ct"), eastern time ("et"), mountain time ("mt"), and pacific time ("pt").

The event time and publish time are regular expressions that may take any number of forms including the following:

(Date (c)=yyyymmdd) (Time (t)=hhmm–hhmm) (Time Zone (z)=zz) (Seasonality (m)=mm–mm) (Recurring (w)=da), where Date (c) is written as (c=yyyymmdd) for a one day event or if the event spans more than one day then (c=yyyymmdd–yyyymmdd), Time (t) is entered in military time; Time Zone (z) has values equal to et, ct, mt, pt; Seasonality (m) contains values 01-12 corresponding to the 12 months starting from January; and Recurring contains values for the days of the week, mo|tu|we|th|fr|sa|su if the event occurs on one particular day of the week or w=da|da–da if the event is broadcast over multiple days of the week.

The following are illustrative examples of using time entry syntax:

every Thursday is written as (w=th);

every Monday-Friday is written as (w=mo-fr);

One Time Live—the event takes place on May 20, 2003 at 6 pm Central for one hour is written as (c=20030520) (t=1800-1900)(z=ct);

One Time Live—live, 24-hour coverage from Mar. 4, 2003 until Mar. 15, 2003 is written as (c=20030304-20030315);

Recurring—the event takes place every Saturday at 3 pm Eastern for 2 hours is written as (w=sa)(t=1500-1700)(z=et);

Recurring—the event takes place every Monday through Friday from 10 pm-3 am Pacific is written as (w=mo-fr) (t=2200-0300)(z=pt);

Recurring—the event takes place every weekday at 8 pm-10 pm Eastern with a special one-hour show on Mar. 15, 2003 at 6 pm Eastern is written as (w=mo-fr)(t=2000-2200)(z=et)+(c=20030315)(t=1800-1900)(z=et); and Seasonal—the event takes place at 6 pm central time on Tuesdays during the months of August through December is written as (w=tu)(t=1800-1900)(z=ct)(m=08-12).

Additional element KEYWORDS is used only if keywords are being added for the search functionality. Element COST is used if there is a cost to view the event. This could be used for pay per view specials.

In the present embodiment the SPORTS_TICKER element is used by sports verticals 120. Various codes for the teams and schools are used to assist in recognition of the event. For example, a football game between the Green Bay Packers and the New York Jets may include "Packers" and "Jets" in the SPORTS_TICKER element. In the present embodiment LOCATION is used by streaming radio, i.e. the location of a streaming station on the web for the event. Analogous tickers could be used for other verticals and event types.

The element ATTRIBUTES contains several tags that generally describe the event's properties. For example, tag LEAF with the value equal to "on" indicates that the event is either a leaf (URL available for event) or category leaf (a leaf with children). Tag HIDDEN with a value equal to "on" indicates that the event should not show up on the site and it should not be published. The tag EMBEDDED, having a value equal to "on", signifies that a media player is embedded with the link for streaming events (i.e., content), and CLIENT indicates the identity of the content provider. In an alternate embodiment, CLIENT may also refer to an end user. Tag ON_DEMAND with a value equal to "on" indicates that the content is available all of the time. If ON_DEMAND is selected (i.e., equals "ON"), time strings EVENT and PUBLISH are not required. If a time string is present for either of these two tags, it will be overridden, as the ON_DEMAND tag takes priority.

The element PLAYER contains several tags that generally describe the media player requirements to play a particular item of content contained in a feed file. The tag FORMAT is displayed on event listings and indicates that this particular type of media player is needed. The media player, such as that offered by Microsoft Corporation under the trade name WINDOWS MEDIA PLAYER, the player offered by Apple Computer under the trade name QUICKTIME or REALPLAYER offered by Real Networks Corp., is a program necessary to display the streaming media content. The tag SPEED is displayed on event listings and indicates the stream speeds available for the event. If the event is available in multiple formats or stream speeds, multiple data is entered in the feed file under the appropriate tag(s). Each stream has a predetermined speed with which it is broadcast over network 105. For example, 28.8 kb/sec is a standard streaming speed for users connected to network 105 using a conventional dial-up modem, while 300 kb/sec is a standard streaming speed for those users connected with a broadband cable modem or other suitable high speed modem connection. SPEED may contain any value to describe the steam transfer speed. It is to be understood that although the present embodiment is described in terms of Windows Media content and Real Media content, it is within the scope of the present invention to utilize any media format heretofore or hereafter known and developed.

The element MEDIA contains several tags relating to the type of media referenced in the feed file. For example, tag AUDIO indicates that the stream contains audio if the value is equal to "yes" while the tag CHAT having a value equal to "yes" indicates that the event is a chat event, that is, multiple users can access the event and read all postings as well as reply to the postings. The tag VIDEO having a value equal to "yes" indicates that the stream contains video. Only those tags having a value equal to "yes" need be present.

The element PROVIDER contains several tags that generally contain information about the provider or source of the content. The tag NAME is the name of the source of the content. For example, Yahoo! Movies, Yahoo! Sports, AOL, ESPN, MSNBC etc., and displays along with the listing of the event. Tag URL is the URL for the specific provider and if the URL is present, the provider's name is presented as a link to the provider's site.

If element ALTERNATE_URL is present, then the data window that is normally generated dynamically from information contained in the feed file, will instead display the web page pointed to by the alternate URL specified by this tag.

According to the certain embodiments of the invention, streams may be accessed and played either by including STREAM data or by including PLAYLIST data in the feed file. Each playback method is described below in more detail. It is understood that new ways to play digital media may be devised and the relevant information may be contained in this feed file without departing from the spirit and scope of the present invention.

The element STREAM contains several tags that generally describe the streams referred to in the feed file. Tag ID is the identification of the stream. In operation, the feed file coming from the content providers may contain multiple data streams and therefore, tag ID is used to differentiate between the various streams. As such, the feed file may include multiple ID tags. That is, the feed file contains information pertaining to an event, such as a television sitcom, and the event could include multiple streams for the same event. For example, a half hour episode of a television sitcom may be broadcast at speeds of 28.8 kb/sec, 56 kb/sec, and 300 kb/sec In addition, the sitcom may be broadcast in two or more media formats such as those viewed on Media Player and Real Player. As such, each of these data streams is referenced in the feed file and each stream contains a unique STREAM ID. Since subscribers may not have access to all of the media players needed to view every data stream nor may they be connected to network 105 using a high speed connection, content providers provide the data streams in multiple format types and stream speeds to accommodate the largest number of subscribers.

While there can be multiple STREAM tags within a feed file, the streams identified in the feed file should have the same content in the present embodiment and only differ in the speed and format type of the stream. Tag SEGMENT is the Stream Segment ID while CLIP is the Stream Clip ID. Each of these values permit the content providers to reference a portion of a longer video clip. For example, the content provider may record a presidential address but only want to link to key points made during the speech. The tag FORMAT describes the format that the stream is presented in. For example, the values could be "wmv"=windows media video, "wma"-windows media audio, "rna"=real networks audio, or "rnv"=real networks video. It is understood that this element could contain other suitable values corresponding to improved methods of providing audio visual information over the network. The tag SPEED, also referred to as BR (Baud Rate), refers to the Stream Speed typically measured in kilobits per second ("kbps") and has values such as 28.8 kb/sec, 56 kb/sec, 100 kb/sec or 300 kb/sec. The speed is limited by the method used to download and play the stream. Typical dial-up modems operate at 28.8 or 56 kb/sec while cable and DSL modems operate at the higher rates. Tag MEDIA_INFO contains all Stream information in one tag.

The element PLAYLIST contains several tags that generally describe information needed to play several items of digital content, typically, referred to as a playlist. A software program, referred to as "Playlist," resides on the network 105 and "resolves" the playlist ID into the item of content comprising the playlist. When the link published on a website is activated by an end user, it launches the Playlist. Such playlist resolution is described in greater detail in PCT Application Number PCT/US02/01840 filed Jan. 18, 2002 entitled, "Method And System For Managing Digital Content, Including Streaming Media" which is commonly owned by the Assignee of the present invention, the entire disclosure of which is hereby incorporated by reference in its entirety. For each stream in the playlist, the element identifies the ID identifying the stream and the order of the stream in the playlist, as identified in the tag SEGMENT ID. Tag FORMAT includes information regarding the format of the stream. For example, the tag FORMAT may contain values such as "wmv", "wma", "rna", "rnv" as described above. Tag SPEED, or sometimes referred to as BR for bit rate, refers to the Playlist Speed that the stream is broadcast at. Tag MEDIA INFO contains all Playlist information in one tag. For example, "ID: 123465 SEG:65432 FMT:wmv BR:56." It is also understood that while the above tags are described with reference to Playlist, any suitable player and corresponding player information could be incorporated into the present invention without departing from the spirit and scope of the present invention.

The element LINK contains several tags that describe additional links that appear in the data window. These links appear in the data window as related links. The tag TITLE refers to the title of the link and URL is the URL that is used to locate the related website. A DESCRIPTION tag permits a producer 150 to add a textual description of the link.

The element IMAGE contains several tags that describe images that may be associated with the event. The tag TITLE describes the title of the image and the tag TYPE described the type of image, such as JPEG, TIFF, etc. The tag SIZE may refer to either the resolution of the image, i.e. 300 Dots Per Inch ("dpi"), etc or the number of colors included in the image or the file size of the image. The tags HEIGHT and WIDTH are the dimensions of the image and could be in any increment, for example Pixels, dpi or inches, etc. The tag YIMGURL is the URL for the actual image location and the tag ID is an identification code for this image. This ID may also be used as a group ID and refer to a particular category of images.

In an additional embodiment, there are programs such as that provided under the trade name MEDIAFRAME, that present streaming media and other digital content to users. Such programs serve the function of retrieving the information from GMDB 110 as described in FIG. 3 and displaying the content to the end user. The elements Channel, Property, and Browse Frame URL may be used by the Mediaframe program. The element CHANNEL indicates the template used for the Mediaframe and is used to launch a particular URL for Mediaframe. Element PROPERTY indicates the source where the page is generated and is used to launch a particular URL for Mediaframe, and BROWSE_FRAME_URL, if present, is the URL that will be loaded in the browse frame.

In an alternate embodiment, the feed file could include a tag APPROVED, which indicated that the feed file has been approved by either a producer or automatically if the feed file complies with a template. The tag APPROVED would contain a Boolean value, yes or no. In addition, a tag APPROVED_ID could also be included to list the ID of the person or process that approved the feed file. These tags could be included as a separate element or included as a sub tag of an existing element.

As previously discussed, content providers submit feed files to GMDB 110 that contain a minimum amount of information identifying one or more digital streams or data files, such as still images or audio files for a particular event. For example, the feed file may contain a FEED_PROVIDER and FEED_ID tag to use in conjunction with each other to identify the event or, alternately, a single tag could be used that is unique for every event submitted to the GMDB 110. This single tag may be assigned by the system upon submission of the feed file.

After submission, the feed file is reviewed, either automatically using a template or manually by producer 150, to determine if the threshold information is present to store the feed file in GMDB. The requisite threshold may be set as a matter of design choice. For example, based on the type of event or content, content provider, and the like. If the information contained in the feed file is not sufficient, producer 150 can add or modify the information before storing the feed file. Depending upon the content of the event, the producer 150 may even decide not to save the feed file in GMDB.

The feed file 300 should be sent to a predetermined URL, for example, the following URL: https://Feeds.Yahoo.com/ingest/ingest.asp?feed=<xml goes here/> where "Feeds.Yahoo.com" is a server, for example, the load balancing server 210 referred to in FIG. 2; "/ingest" is a directory on server 220; "ingest.asp." is a file on server 220; and the XML document (of FIG. 3 in the present embodiment) is appended, where indicated. It is understood that feed file 300 could be sent to any URL that operates in accordance with the present invention.

According to the present embodiment, feed file 300 should be in the format specified in FIG. 3, and, although different embodiments may require less or more information, feed file 300 requires a minimum amount of identifying information, including FEED_PROVIDER, FEED_ID and TITLE. For elements or attributes with no values, the inclusion of the element in feed file 300 is not required. In addition, if element URL is included in the feed, no STREAM or PLAYLIST element information is needed. FEED_ID must be unique amongst all FEED_ID's or unique only with respect to each FEED_PROVIDER in order to identify events in GMDB 110. In the present embodiment, FEED_ID is generated by the source of the event (e.g., content provider) and therefore is unique only among events from the same source. In alternate embodiments, the system may assign a FEED_ID that is unique among all events (e.g., each provider having certain IDs to assign, like a unique prefix).

As described in greater detail with reference to FIGS. 5 and 19, processing of certain content provider submissions can be automated so that when feed files come in from either a trusted source or an authorized source, a template or rule is applied to determine whether all of the necessary information is present in the feed file. If so, the feed file is identified as approved and automatically stored in GMDB thus becoming available for searching. No producer intervention is needed. If the feed is approved, an ID number or other suitable ID could be stored in the XML_ID tag. In an alternate embodiment, an additional element could be added to FIG. 3 labeled "APPROVED" and given a value of "Yes" if approved.

If the information contained in the template matches the information from the feed file, then the feed file 300 can be approved and automatically stored in the database. Feed files 300 may be identified as approved and available for searching in any number of ways, including for example, simply by inclusion in the GMDB, by setting a flag associated with the file 300, including a field or tag identifying whether the file is approved and the like. In an embodiment of the invention, the template may contain a list of feed file elements and tags and/or corresponding values. When a feed file 300 is received by GMDB 110, a template is applied by comparing the required elements and tags from the template with those contained in the feed file 300. The template may not only require that certain elements and tags are present and contain data but may also require that the tags contain specific data that matches the corresponding values. For example, submissions of a personal dating vertical, such as Y! Personals, information does not require review of a producer 150 if the information present satisfies the Y! Personal template, where the Y! Personals template requires, by way of example only, that elements DATA, URL, DESCRIPTION and PUBLISH are present and contain any data. It is understood that FIG. 3 may be modified to include fewer or additional elements and tags. With reference to Y! Personals, the feed file 300 may contain a specific element PERSONALS with exemplary tags such as NAME, ADDRESS, SEX, STATUS, HOBBIES, PHYSICAL_DESCRIPTION, SMOKER, HEIGHT, WEIGHT, and the like. In an alternate embodiment, the template may require that the tag SEX contain only "M" or "F".

In order to update an event, the content provider sends another feed file with the same FEED_PROVIDER and FEED_ID values. The feed file can contain either all of the data or just the updates. Updates should be provided, for example, when additional media formats are included, the time or duration of the event has changed, or additional descriptive information becomes available.

GMDB 110 not only receives incoming feed files, updates the information in the feed files and stores the feed files in the system, it also accepts and responds to requests from subscribers such as various verticals 120 and other subscribers 130 for feed files containing information to include on their web sites to link to digital content including streaming media files. These links to digital content are used by the end users to access the streaming media files or other digital content. In the present embodiment, as describe in greater detail with reference to FIG. 3, certain element(s) and/or tag(s) are used to locate and access digital content, for example, URL, PLAYER, MEDIA, STREAM, PLAYLIST and the like. For example, a link to the streaming media file is presented on a web page provided by the verticals 120 or the subscribers 130 and, as is known, permits a user of the web page to access the streaming media file without knowing where the stream is being broadcast from simply by activating the link.

Referring to FIG. 4, there is shown an exemplary description of a request file 400 used to query GMDB 110 for particular feed files. Request file 400 is used whenever vertical 120 or subscriber 130 requests feed files from GMDB 110 to display on their website. The request file may be constructed using the following format:

<REQUEST type="queryxmltext"><WHERE> </WHERE></REQUEST>, and the WHERE clause can contain:

For searching elements of feed files, <PARENT_NAME ELEMENT_NAME="value" OPERAND-"operand"/>, where "PARENT_NAME ELEMENT_NAME" corresponds to the element in the feed files being searched and "value" is the value being searched for such element; and For tags within elements in the feed files <TAG_NAME OPERATMD="operand">value </TAG_NAME>, which searches tag "TAG_NAME" according to the specified operand and value. The request file 400 can search one or more elements or one or more elements and one or more corresponding tags. Thus, as further described below, the request file requests an answer file, and also contains one or more search criteria (e.g., values of elements and/or tags in the feed file. Request file 400 is illustrative of an example of a request according to an embodiment of the present invention. It is to be understood, however, that additional search criteria, for example, corresponding to any information stored in the feed file, elements and or tags may be added to the request file in order to make the request more specific. In response to receiving the request file; server 220 queries the GMDB 110 for new, updated or existing feed files that match the search criteria.

A request from either verticals 120 or subscribers 130 begins with a request file as described in FIG. 4. The request file is forwarded via network 105 and distributed to GMDB web servers 220. Although an XML document in the present embodiment, the format for the request file 400 could be, for example, HTML or other format, and sent via a secure or unsecured protocol, such as HTTPS or HTTP. Once the request file 400 is received and processed by web servers 220, an answer file in XML format, or other suitable format, is returned to the requesting party. The answer file contains feed files that match the submitted search criteria, which, in turn, contain information necessary to locate and play the requested digital content from the content providers and may also contain additional descriptive information pertaining to the digital content. The XML data in the answer file and accompanying feed files may be extracted using HTML code within the subscriber's web page or extracted by the web browser. The mechanisms by which a subscriber extracts and utilizes the XML data contained in the answer file can be accomplished by other known techniques specific to each subscriber.

The feed file(s) included (or identified) in the answer file may include the URL link to the requested digital content, or, if the URL link directly to the content is not present, the content may be played using information found in the STREAM or PLAYLIST elements such as the Stream ID or Playlist ID. As described above, element PLAYLIST of feed file 300 contains several tags such as ID, SEGMENT, FORMAT, SPEED and MEDIA_INFO, which are used by Playlist to view the content. Therefore, if a URL was not present but PLAYLIST information was, the subscriber would include the PLAYLIST URL and identifying information on their website so that end users could access the digital content using Playlist. In an alternate embodiment, a URL directed to Playlist having the Playlist ID appended thereto may also be stored in the feed file and returned in the answer file. By way of example, the information returned in the answer file could be one or more of the elements contained in FIG. 3 or any element or tag added to FIG. 3 that provides a more complete description of the requested content. In still other embodiments, GMDB sends an electronic copy of the event content to the user.

In operation, whenever either vertical 120 or subscribers 130 wish to request feed files describing content from GMDB 110, the subscriber from vertical 120 or from subscriber 130 should first be added as an authorized user in GMDB 130 and given "request" or "admin" permissions. Then, the subscriber should log in to GMDB 110 using a valid User ID and corresponding password. Once the subscriber logs in, they create a request file formatted according to FIG. 4 and post the request file to the following exemplary URL:

https://Query.server.com/xmlquery/xmlrequest.asp?L= userid&p=password&sXML=<request/>, where "https:// Query.server.com" is a server, for example, load balance server 210, "/xmlquery" is a directory on server 220; "xmlrequest.asp" is a file on server 220; and where "userid" and "password" are the user ID and password received from the subscriber 130 for log in verification and "request" is the contents of the request file as described in FIG. 4.

It is understood that request file 400 could be sent to any URL that operates in accordance with the present invention. While the above example is given in terms of posting to a secure site, it is understood that this posting could also be to a non-secure URL or any URL that operates in accordance with an embodiment of the present invention.

An example of a request for all events having a value of "John Smith" as the "assignee name" with a "title" tag containing the string "test" is as follows:
<REQUEST type="queryxmltext"><WHERE><ASSIGNEE NAME="John Smith"/><TITLE OPERAND= "LIKE">% test %</TITLE></WHERE></REQUEST>

As another example, in order to send a request for all events under the category path "/Radio" with the title containing the string "archives", the request would be in the form of:
<REQUEST type="queryxmltext"><WHERE><CATEGORY PATH="/Radio %" OPERAND= "LIKE"/><LINK TITLE="% archives %" OPERAND= "LIKE"/></WHERE></REQUEST>

In order to reduce the amount of involvement of the engineer for repetitive requests for content, the particular requesting vertical 120 or subscriber 130 may be configured to automatically request any new information stored in database 240 on a periodic basis. For example, a Personals vertical 120 can be configured to request new or updated submissions every 15 seconds to ensure recently added user profiles are accessed. Allowing such automatic requests or the frequency of such requests may be reserved to subscribers that pay a premium for this service.

Figure 5B:
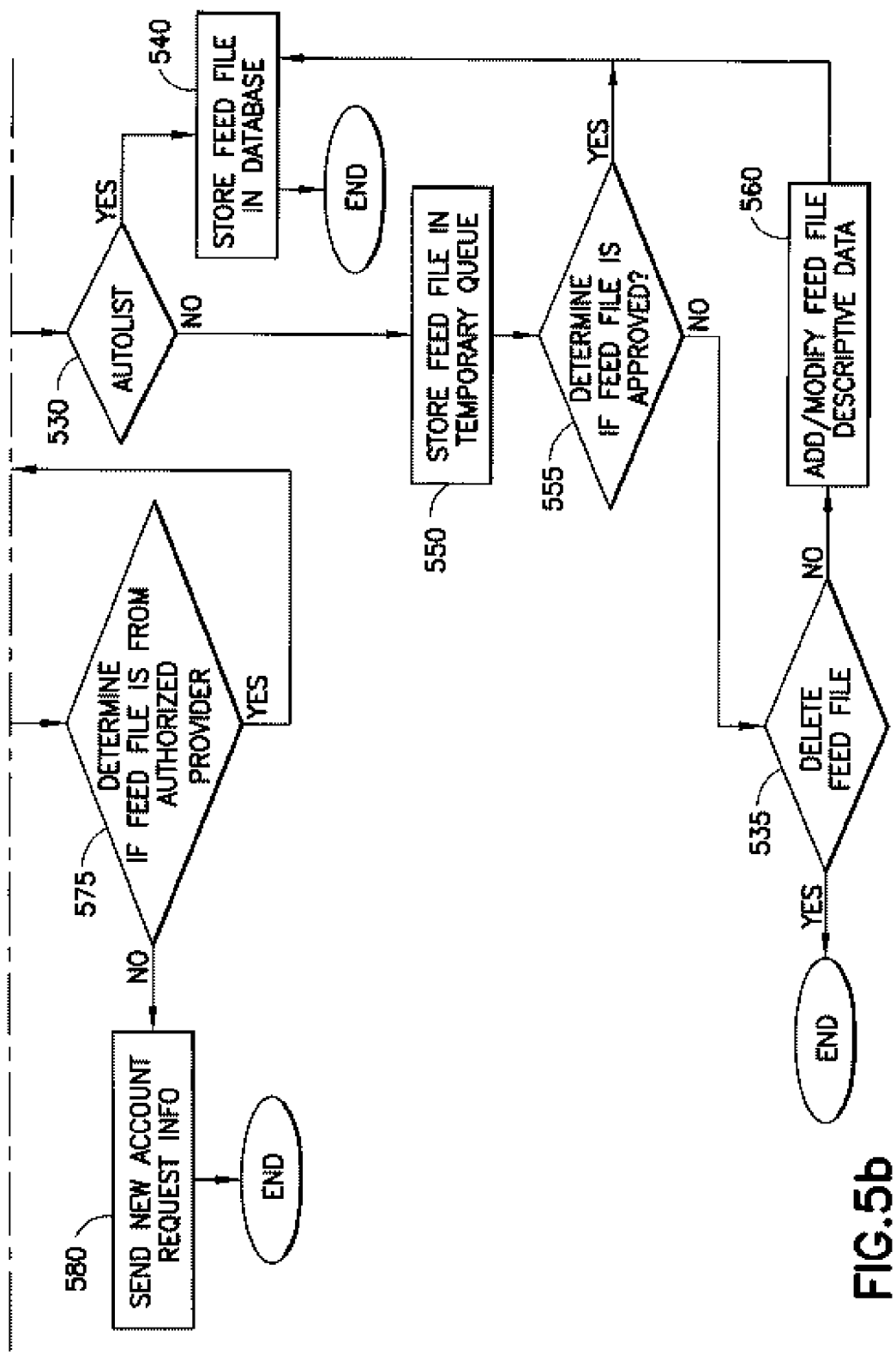

Turning now to FIGS. 5*a* and 5*b*, with continuing reference to FIG. 2, there are shown flow charts illustrating the process of receiving and processing feed files according to an embodiment of the present invention. Server 220 receives a feed file from at least one of the content providers 160, 170 and 180. Step 500. Server 220 stores the feed file in a queue 200. Step 505. Next, server 220 sends a confirmation of receipt to the content providers acknowledging the successful receipt of the feed file. Step 510. First load balance server 210 then distributes the feed file to an available GMDB Web Server 220 using any of the several distribution methods previously described. Step 515. Server 220 determines if the feed file is from a trusted source. Step 520. A trusted source of content, for example, generally submits content that requires little or no modification by the system or producer 150 and may refer to a content provider that submits feeds that are prescreened for content, contain a minimum amount of descriptive information, for example, FEED_ID and FEED_PROVIDER and have billing information previously established. In operation, a trusted source may be a feed file coming from a service provider's system, such as the content management system ("CMS") described in PCT Application Number PCT/US02/01840 described above. It is understood that in order for an event to be stored in CMS, the feed file has been analyzed, additional descriptive information has been added, if necessary, and the content provider has been authenticated and billed if appropriate.

If the feed file is from a trusted source, server 220 applies a template stored in database 240, Step 525, and determines whether or not to approve and automatically list the feed file. Step 530. The automatic list functionality designates the feed file 300 as approved and enables a feed file to be stored in GMDB 110 without the assistance of producers 150. The template applied in step 525 can be customized to each individual content provider, or category of feed and/or other defining criteria of the event or content. The template may have several functions, including checking that the information contained in the feed file matches the information required by the template. For example, the template may compare the data in the ID tags against the list of assigned Ids to ensure it is valid; it may compare the data in the SPEED tag to a list of acceptable values, to ensure it is valid. Additionally, the template may identify impermissible entries, such as expletives. Such expletives are identified by parsing the tag strings and comparing each entry against the template entries. Any match could be removed before approving the feed file or the feed file could simply be disapproved. In an alternate embodiment, the template contains default information that is stored in the feed file prior to it being approved. The default information can be used if information is missing from the feed file or information already contained in the feed file is to be overridden. That is, the template may store information in each feed file so that certain feed files contain uniform information.

If the feed file contains the appropriate descriptive information, and the template applied by web servers 220 determines that all of the required information is present, the feed file describing the event is approved and the software applying the template can direct the feed file to be automatically stored in GMDB 110 in database 240 or 140 for subsequent access by verticals 120 and/or other subscribers 130.

If the decision is made to auto list, Step 530, server 220 stores the feed file in the database 240. Step 540. If descriptive information is missing from the feed file and the template applied by web server 220 does not indicate that all of the necessary information is present, the feed file is stored in the temporary queue 241. Step 550. The temporary queue 241 could be contained, for example, within the storage device 245 or stored in device 140. Next, the producer 150 determines if the feed file is approved. Step 555. It is a function of the producers 150 to determine whether or not the feed file requires additional descriptive information or whether the event referenced in the feed file is suitable for storage in GMDB 110. If not, the producer 150 can delete the feed file and the process ends. Step 535. In an alternate embodiment of the invention, the feed file remains in the queue 200 until producer 150 selects the feed file for review, modification and approval, at which time, the feed file is then stored in the database 240.

If the producers do not delete the feed file, step 535, the producer 150 can then add or modify the descriptive information for each feed file, step 560, and store the feed file in the database 240. Step 540. At this point, the feed file is approved and stored in the database 240.

If the feed file is not from a trusted source as determined in step 520, server 220 determines if the feed file is from an authorized provider by comparing the received FEED_PROVIDER tag data to a list of authorized providers. Step 575. If the feed file is from an authorized provider, the process continues with step 525 as previously described. An authorized provider may have been previously authorized by the service provider to submit feeds for storage and promotion. These providers will have an account and billing information stored on an outside server or billing authentication server 270. If the feed file submitted to GMDB 110 is not from either a trusted source or an authorized provider, server 220 sends a message to the content provider with information on how to request a new account and the process ends. Step 580.

It is understood, that in an alternate embodiment of GMDB 110, a content provider may log in and be authenticated prior to submitting a feed file to queue 200. Accordingly, steps 520, 575 and 580 would be removed and step 515 would flow directly to step 525, as there would be no need to verify the source of the content since the provider has logged in successfully to system 110.

Figure 6:
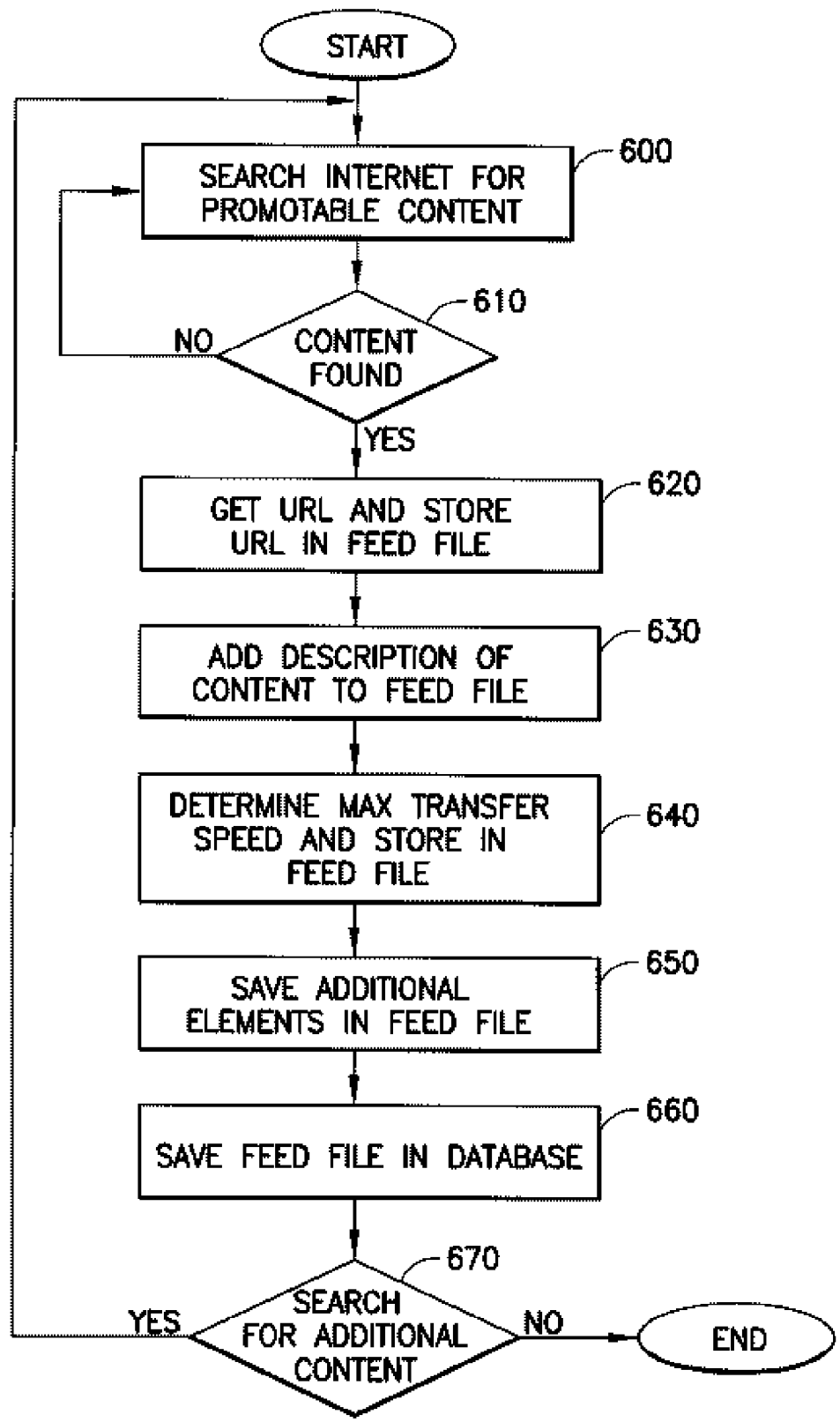
FIG. 6 is a flow chart illustrating the process according to an alternate embodiment of the present invention.

Turning now to FIG. 6, there is shown a flow chart illustrating the process of adding free surf content according to an alternate embodiment of the present invention. In this embodiment, each vertical 120 or subscriber 130 may have an engineer and/or a producer 150 who is responsible for maintaining its site and keeping the links informative and up-to-date. Producers 150 search the network for links to streaming media data which are of interest, step 600, and store them in GMDB 110. Server 230 then determines whether or not the content was found. Step 610. If not, the producer continues to search. Step 600. Next, server 230 obtains the URL of the located content and stores the URL in a feed file. Step 620. Producer 150 can then add a description of the content to the feed file. Step 630. Server 230 determines the maximum available transfer speed for the content and stores the information in the feed file. Step 640. In an alternate embodiment, this step may be eliminated if the content found includes a field identifying the transfer rates available to view the content. Once the maximum transfer speed is set, lower transfer rates can also be stored in elements of the feed file. Any additional descriptive information can be stored in the feed file in step 650. The additional information generally includes further description about the content or source of the digital content, alternate location for the file, etc. The feed file is stored in the database 240 in step 660. Lastly, server 230 determines whether or not additional content is desired. Step 670. If not, the process ends. If additional content is required, the process continues with step 600.

Figure 7:
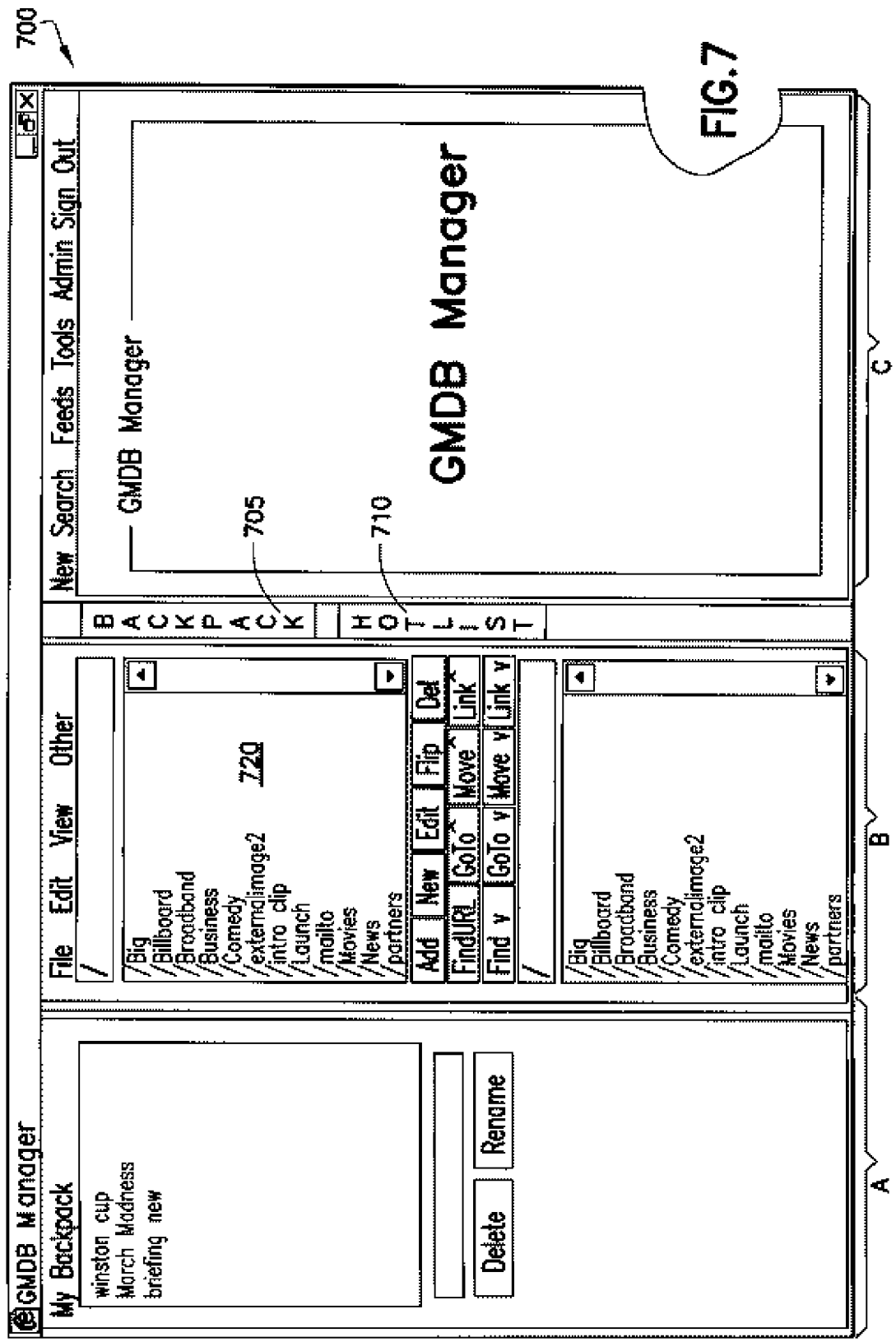
FIG. 7 is a screen shot of a graphical interface in accordance with an embodiment of the present invention.

Turning now to FIG. 7, there is shown a screen shot of a graphical user interface ("GUI") 700 in accordance with an embodiment of the present invention. In general, the GUI 700 is used by producers 150 to easily update, modify, add or delete information from GMDB 110. The GUI 700 provides graphical objects that can be manipulated, such as icons, windows, and various controls, to control underlying data, software or hardware represented by the graphical objects. Typically, a user interacts with the graphical user interface using a graphical pointer that is controlled by a pointing device, such as a mouse or trackball, to accomplish conventional drag and drop techniques and other graphical object manipulations.

In the present embodiment, GUI 700 resides on server 230 and may be accessed by any producer 150 having access to network 105. GUI 700 contains at least one, but preferably three panes adjacent each other. Backpack Pane A, Hotlist Pane B and GMDB Manager Pane C. Each pane presents information to producer 150 wherein the producer is able to view, add, delete and/or modify the information. A producer 150 has the option to set the desired view, either one, two or three panes, to open at startup. It is to be understood, that the GUI 700 is merely illustrative of the GUI that could be used to present information to subscribers. Indeed, other interfaces present more or less information and allow for more or less functionality in any other graphical or other presentation format. In this regard, FIGS. 8a-19 show other illustrative GUI's.

The Backpack Pane A stores commonly accessed feed file(s), commonly run searches for feed files and other commonly referenced tasks that the producers 150 perform. The Backpack Pane A could store the actual searches or links to commonly used searches. In addition, the Backpack could be unique to each producer 150 or global for all producers or any combination thereof. By selecting a backpack button 705, the Backpack pane A opens up and permits the producer to enter and store common searches and information the producer 150 wants to figuratively "take with them" and access easily in the future. In addition, the producer 150 may either delete or rename entries stored in Pane A. Both a delete and a rename button are located on Backpack pane A.

Selecting a Hot List button 710 opens up the Hotlist Pane B that displays the hierarchy structure (Hotlist) of the stored feed files as previously described, for example, category, leaf, category leaf and data window, and permits the producers 150 to locate and store feed files in the GMDB 110. In an embodiment of the invention, each feed file is stored under the appropriate category or category leaf. The tag PATH from element CATEGORY is modified to reflect the location of the feed file 300 in the Hotlist. When a feed file 300 is submitted to the GMDB 110, the CATEGORY PATH may or may not contain data, accordingly, using the Hotlist Pane and the GUT 700, producers are able to surf content directly into its appropriate location in the Hotlist. In the present embodiment, Pane B contains three windows whose operation is described in further detail with reference to FIG. 10.

The information presented in GMDB Manager Pane C is retrieved, in part, from the feed file as described with reference to FIG. 3. If feed files 300 are submitted to GMDB 110 and require additional descriptive information, the producer 150 is able to modify the information by accessing GUI 700 and change the information on Pane C of the GUI 700. It is to be understood, that the GUI 700 is merely illustrative of the GUI that could be used to present information to subscribers. Indeed, other interfaces present more or less information and allow for more or less functionality in any other graphical or other presentation format. In this regard, FIGS. 8a-19 show other illustrative GUI's.

Figure 8A:
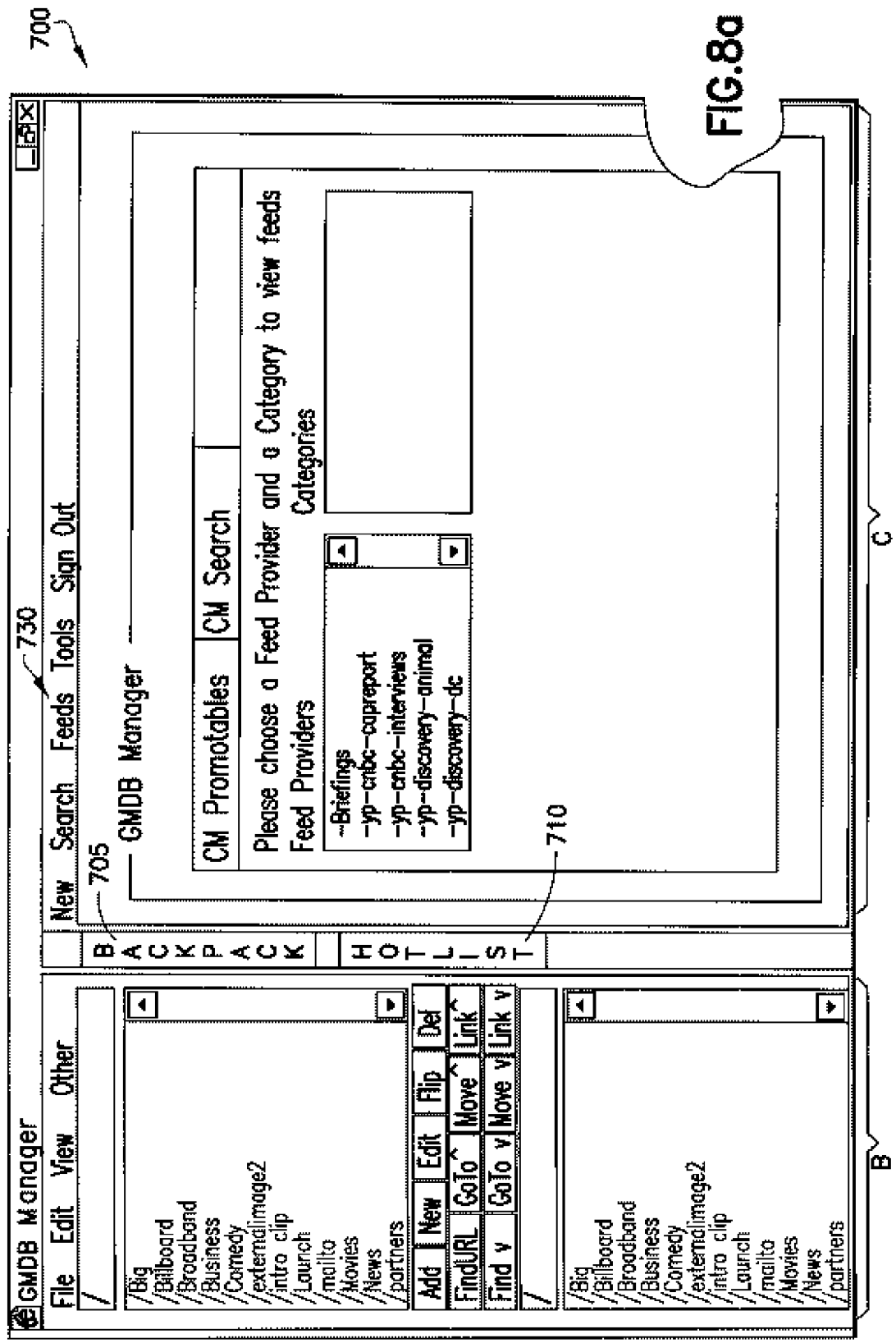
FIGS. 8a and 8b are screen shots of a graphical interface for adding content in accordance with an embodiment of the present invention.
Figure 8B:
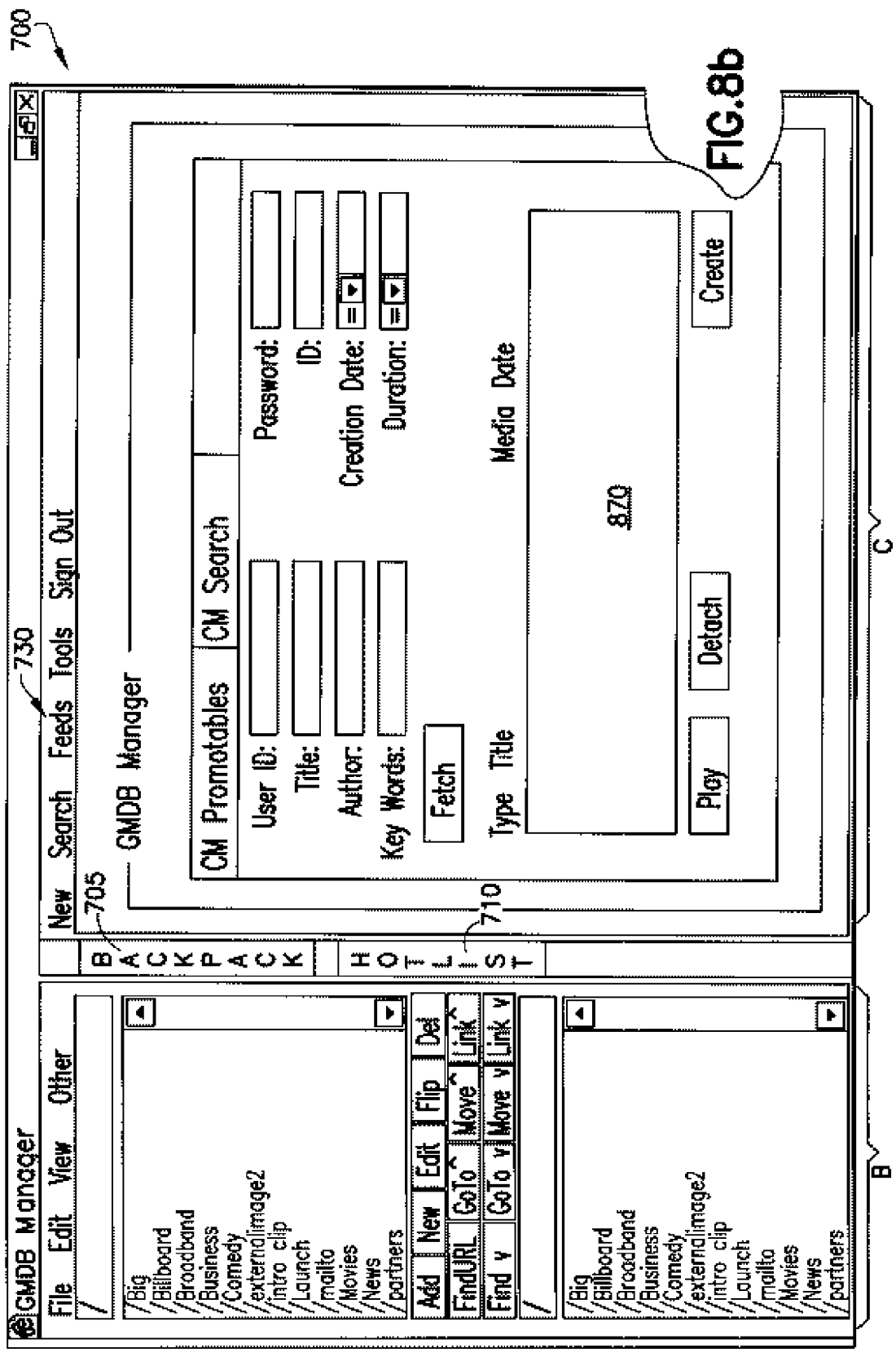

Referring now to FIGS. 8a and 8b, there is shown screen shots of GUI 700 for adding feed files according to an embodiment of the present invention. GUI 700 permits the producer 150 to add new feed files from a trusted source, for example the CMS system previously described. This function allows the producer to retrieve the feed files from CMS, and add them to the GMDB 110 using Hotlist Pane B. Pane B also permits the producer 150 to save other related information, like for example, time, date, and event description in the feed file. In operation, the producer clicks "New" in a toolbar 730, then selects "Add from CMS" from the drop-down menu. The producer is presented with a screen having two search tabs, "CM Promotables" (default page) and "CM Search". For the CM Promotables screen, FIG. 8a, the producer 150 must choose a FEED_PROVIDER and a CATEGORY. Then, a list of feed files matching these criteria will be displayed. Selecting a feed file displays all of the descriptive information for the feed file in Pane "C". The information may be presented in the GUI 700 to the producer 150 as a series of tabbed windows as shown in FIG. 9.

If producer 150 selects the "CM Search" tab, then the producer enters an assigned username and password and upon a successful login, the GMDB 110 system presents the producer with the fields displayed in FIG. 8b. The producer 150 may then enter search criteria in one or more fields to obtain the desired feed file(s). For example, the producer may search for feed files after a certain date, streams before a certain date, or streams having a particular Title, Author or Key Words. Once the appropriate search criteria is entered, the producer clicks the "Fetch" button to grab the information from CMS. All feed files that match the criteria are provided in a data sub window 870. It is understood that additional search categories and search criteria can be added to this window to customize the searching capabilities. The producer 150 then selects feed file(s) from the data sub window 870 and selects the "Create" button. A new feed file is created in GMDB 110 from information contained in the feed file selected by producer 150. Next, the producer may add and/or modify the descriptive information in the feed file as needed. Once complete, the producer clicks on a "Save" button (not shown). In addition, the producer may either play the feed files or detach the feed files from data sub window 870 by selecting the "Play" or "Detach" respectively located below data sub window 870. In an alternate embodiment, the information contained in CMS may also be links to actual events and digital content. In this situation, the paths to the digital content would appear in data sub window 870. Multiple links could be incorporated into a single feed file if the content was identical, but the links referred to different media format or speed.

Figure 9:
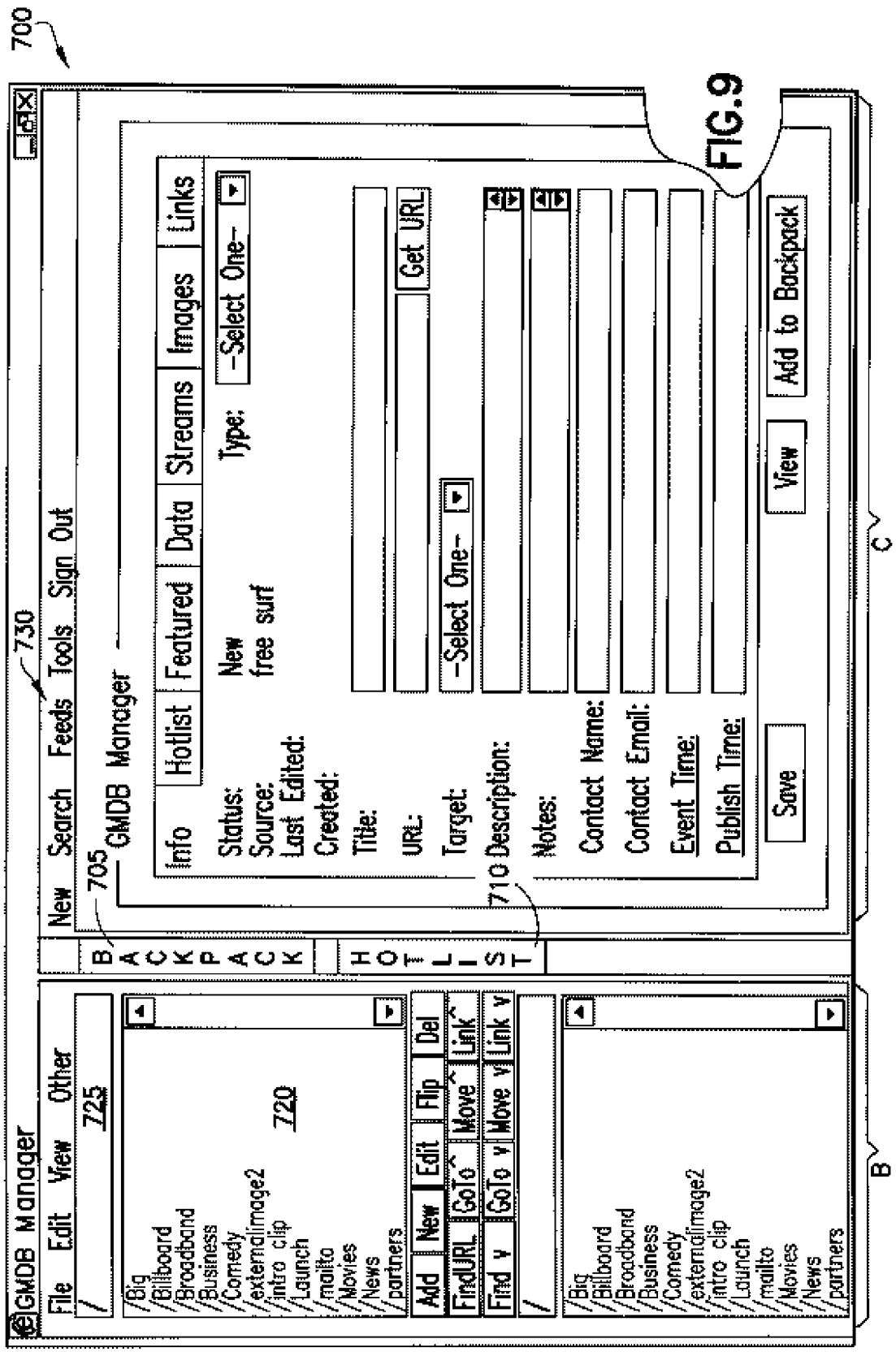
FIG. 9 is a screen shot of a graphical interface for adding content in accordance with an additional embodiment of the present invention.

Turning to FIG. 9, there is shown a screen shot of a GUI for adding feed files in accordance with an additional embodiment of the present invention. Interface 700 is seen with Backpack Pane A closed, and GMDB Pane C configured to show the fields, for example, the elements and tags, available when adding content to GMDB 110 via the "free surf" method. As previously stated, new events and content, described in feed files, can be added to GMDB 110 using the "free surf" method, i.e. by surfing the web and then adding the relative information, such as, URL, time, date, description, etc. In operation, producer 150 selects the "New" menu in a toolbar 730 and selects "free surf" from the drop-down menu. Then, the producer 150 selects the "Info" tab displayed on Pane C. Once the requested window appears, the producer clicks on the "Get URL" button to surf the web. This opens a new web browser window which will "talk" to the GMDB Manager Pane C. Once producer 150 finds content with a URL to add, the producer clicks "Get URL" and the URL of the linked web browser window page appears in the URL box.

Once the information appears in Pane C, the producer may add, delete or modify information about the content such as, for example, title, description, notes, contact name, contact e-mail, event time, and published time. In addition, the producer may select the type of link which may be either category, leaf, category leaf, or data window as previously described. The producer may add also additional information on the additional tabs labeled: Hotlist, Featured, Data, Streams, Images and Links as shown on FIG. 9. These additional tabs will be described below. Once the producer 150 has added all of this information, they can click the "Save" button at the bottom of the screen and the data is stored in the feed file. The fields displayed in Pane C of interface 700 correspond to the tags contained in the feed files as described with reference to FIG. 3. If this link is something that the producer may refer to often, they may select the "Add to Backpack" button located on the bottom of Pane C. This will add a link in Backpack Pane A (not shown). Selecting Backpack button 705 and clicking on the newly entered link directs the producer directly to this entry in GMDB 110.

There are six tabs that are available when "New" is selected from toolbar 730 and "free surf" is selected from the drop-down menu. The tabs are Info, Hotlist, Featured, Data, Streams, Images, and Links and contain groups of tags for entry into the feed file. A description of each tab follows. It is understood that these tabs could display the information from any element or tag assigned to feed file 300, for example, those described in FIG. 3 and could be as few as one tab. These tabs may also be present when a producer is examining a feed file submitted to the GMDB by the content providers.

Figure 10:
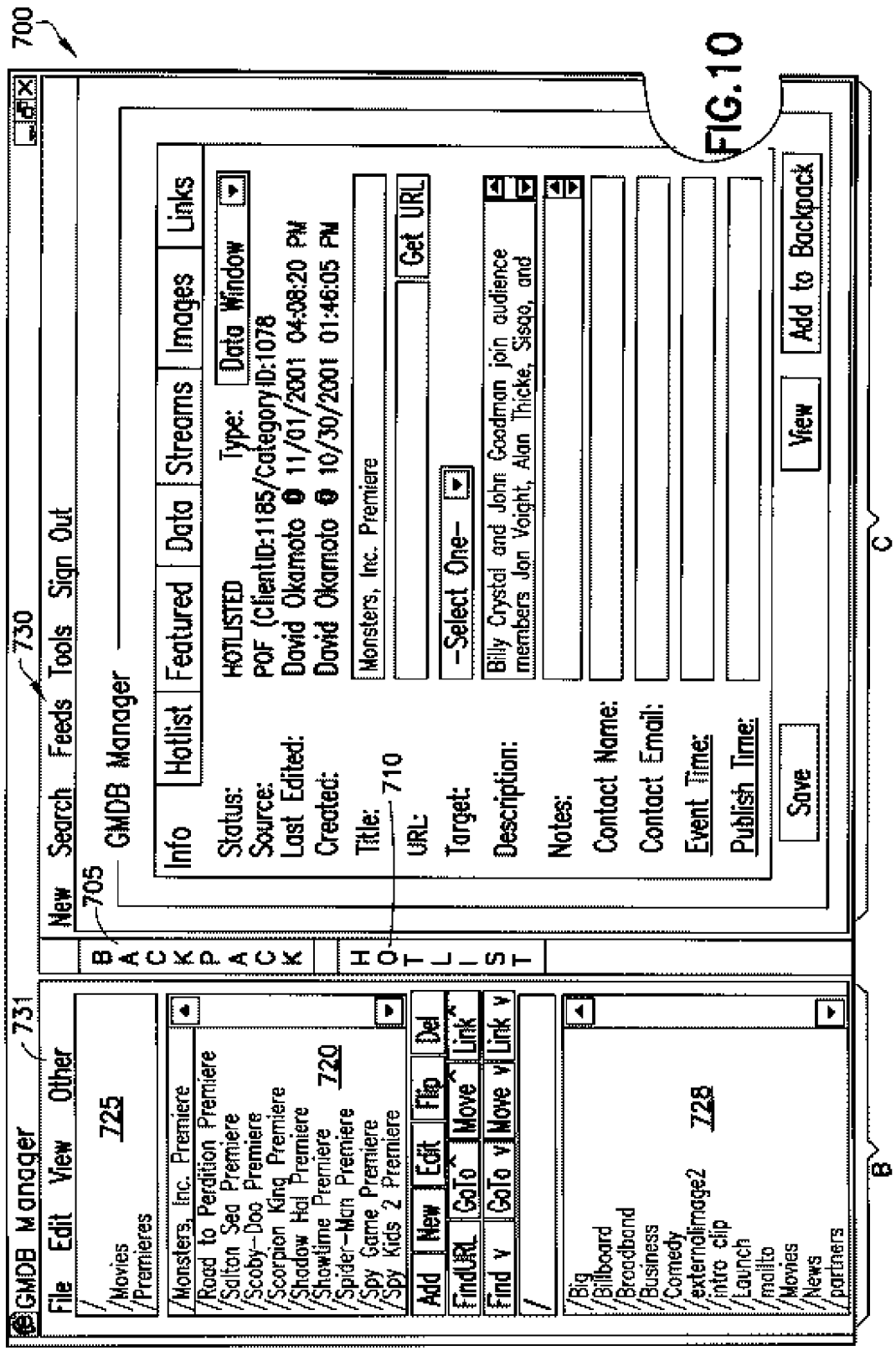
FIGS. 10-16 are screen shots of a graphical interface in accordance with an embodiment of the present invention.

Referring to FIG. 10, the "Info" tab contains information about the feed files, for example, time, date, title, and description of the event. In addition, a TYPE tag may contain values such as "category", "leaf", "category leaf", and "data window" as described above. Depending on the event type, certain tags will not be relevant and, thus, will be disabled or grayed out.

The TITLE tag on the Info tab refers to the title of the event that wilt appear on the site in the both featured listings and also in the Hotlist listings and search results. The URL tag is the URL for the event that is being added. As previously described, entering the URL in the free surf method is accomplished by clicking on the "Get URL" button or by just inserting the URL manually. The DESCRIPTION tag is the description of the event and will appear on the listing pages on the subscriber's website. The CONTACT NAME and CONTACT E-MAIL tag permit the producer to enter client contact information. The EVENT TIME tag is the time of the event, and includes both the START and END DATE and TIME. The producer may either enter the time string directly into time tag or select event time label (underlined link) and launch an interface which simplifies entry of the time. Next, the PUBLISHED TIME tag refers to how long the page is to appear on the site. Often, the EVENT TIME and PUBLISHED TIMES will be different. The published time may be longer because it will often include the length of the archive, etc. Like the event time, the published time may be either entered directly by the producer or entered via launching the time interface by selecting the publish time tag (underlined link).

If the TYPE of content contained in the feed file is a "leaf", selecting the "View" button located at the bottom of Pane C opens a browser window at the URL listed under the "Info" tab. If the TYPE is designated as a "category" or "category leaf", a preview of that category, as it will appear on the web site, will be shown. If the TYPE is a top level "category", then the producer will have a choice of which day of the week to preview the category. Lastly, if the TYPE is a "data window", selecting the "View" button at the bottom of the screen will preview the data window.

Occasionally, the information contained in a feed file will become outdated and will have to be updated. For example, the event time, title, and/or description contained in the feed file, among other tags, may have changed. These changes will not be incorporated automatically. A producer must approve the updates. To do this, the producer will have to click on a "View Update" button (this button will only appear when updates are available). A window will open with the updated values and a checkbox beside each updated field. When the "Update" button is clicked, values of the tags that are checked will replace the original values. Clicking the "Save" button under the Info tab will then save the updated information. In an alternate embodiment, the updates may not require producer approval depending upon the identity of the FEED FILE PROVIDER.

Note that for the "Info" tab, if the media type is "category", the URL, event time and published time will be grayed out. If the event type is "category leaf" or "data window", just the URL will be grayed out.

The operation of the Hotlist pane B will now be described with reference to FIG. 10. In general, the Hotlist pane B simplifies entry of content into the Hotlist hierarchy. In order to simplify entry of events into the Hotlist, Hotlist pane B contains a button bank D with an "add" button to add the current URL in the same fashion the URL was added with the "get URL" button of FIG. 9. This function uses a web browser window, specifically, an Internet Explorer window that GMBD 110 opened. In the present embodiment, it does not work with an Internet Explorer window not opened by GMDB 110. A "new" entry button permits the producer to add a new hotlist category into the hierarchy. An "edit" button permits the producer to pull up the "info" tab on Pane C that correlates with a highlighted entry in a hierarchy sub window 720 of Hotlist pane B. For example, in FIG. 10, "Monsters, Inc. Premiere" is highlighted in hierarchy sub window 720 and the PATH appears in a selected path window 725. Tag PATH is the Category and Category leaf hierarchy for this particular data window. Note that the information from the Monster Inc. Premiere feed file describes an underlying event made up of multiple pieces of digital content. The information from the feed file 300 is automatically populated into the appropriate fields on Pane C once the "edit" button is selected. For example, the TITLE is completed as well as a DESCRIPTION for the event or digital content. This event is of TYPE "data window" and has been Hotlisted based on information contained in the STATUS and TYPE data tags.

The "delete" button is used to delete a listing from Hotlist. It should provide producers with a warning asking them if they are sure they want to delete the listing. Once the listing is deleted, it is moved to an obsolete mode similar to the Trash bin in the WINDOWS operating system. In addition, a "FindURL" button permits the producer 150 to locate a URL in the hotlist that is displayed in the browser window previously opened by GMDB 110 and displays the URL if present in the Hotlist in a lower hierarchy window 728 for inspection. In addition, the "flip" button will alternate between hierarchy sub window 720 and lower hierarchy window 728.

The "find" button works from the upper window 725 to the lower window 728 by finding all of the other hotlist entries that are linked to the initial entry. If the node selected in the upper window 725 is a "link" used to identify a collection of feed files, this button will find the feed file(s) that the selected links points to. Links are described in further detail with reference to FIG. 16 below.

Next, the "GoTo" buttons both up (^) and down (v) matches the path in one hierarchy window 725 to the path in the other hierarchy window 728. If the producer selects the up button it takes the path in lower hierarchy window 728 and moves it to hierarchy sub window 720. Similarly, the "Move" up (^) and down (v) buttons move a site, leaf, or category to the category that is open in the other window within the Hotlist Hierarchy.

A hotlist toolbar 731 appears at the top of hotlist pane B. Selecting the "file" menu on hotlist toolbar 731 reveals at least five choices: "save bookmarks", "view bookmarks", "preview home page", "page preview" and "exit". Selecting "save bookmarks" from the drop down menu allows the producer 150 to permanently save the feed files or links to the content. The "view bookmarks" selection in the file dropdown menu permits the producer to view the different keyboard settings to see what is associated with each key. For example, shortcuts to particular menu items can be assigned to selected keys or key combinations. Next, the "preview homepage" selection permits the producer to see a listing of feed files organized by a particular day. Next, the "page preview" selection permits the producer to preview the page selected. Lastly, the "exit" button closes the hotlist tab within GMDB 110.

The "edit" menu on hotlist tool bar 731 contains entries which are similar to those functions performed by the buttons in bank D. In addition, a "change" menu permits the producer to change the URL of the selected feed file 300 to that of the browser window opened by GMBD 110. In addition, the producer may select "rename" in order to change the name of a feed file 300.

The "view" menu on hotlist toolbar 731 contains three choices: "sort alphabetical", "sort by type" and "sort by weight". The sort alphabetical selection lists everything in the hotlist alphabetically. While the sort by type lists all of the feed files according to type. All categories are listed first and together, then the leafs, etc. The sort by weight selection is used if each entry in the Hotlist is given a priority weight. If so, those entries with the highest weight will appear higher on the list.

The "other" menu option in hotlist toolbar 731 contains three choices: "Goto Path", "Goto Space ID", and "SpaceID". The "Goto Path" allows the producer to type in a specific PATH they are looking for in the display box while the "Goto SpaceID" goes to the SpaceID which is a number associated with each listing and category. These IDs may be used to assign commercial ads to specific areas. Next, "SpaceID" is the number assigned to each piece of the hierarchy and used, among others, by sales to assign and target advertising to specific categories.

Selecting Hotlist button 710 from Pane C, reveals Hotlist Pane B. As discussed previously, the Hotlist hierarchy is comprised of the different categories of content represented on the subscriber's site. For example, Movies, Billboard, Partners, News, People, etc.

Figure 11:
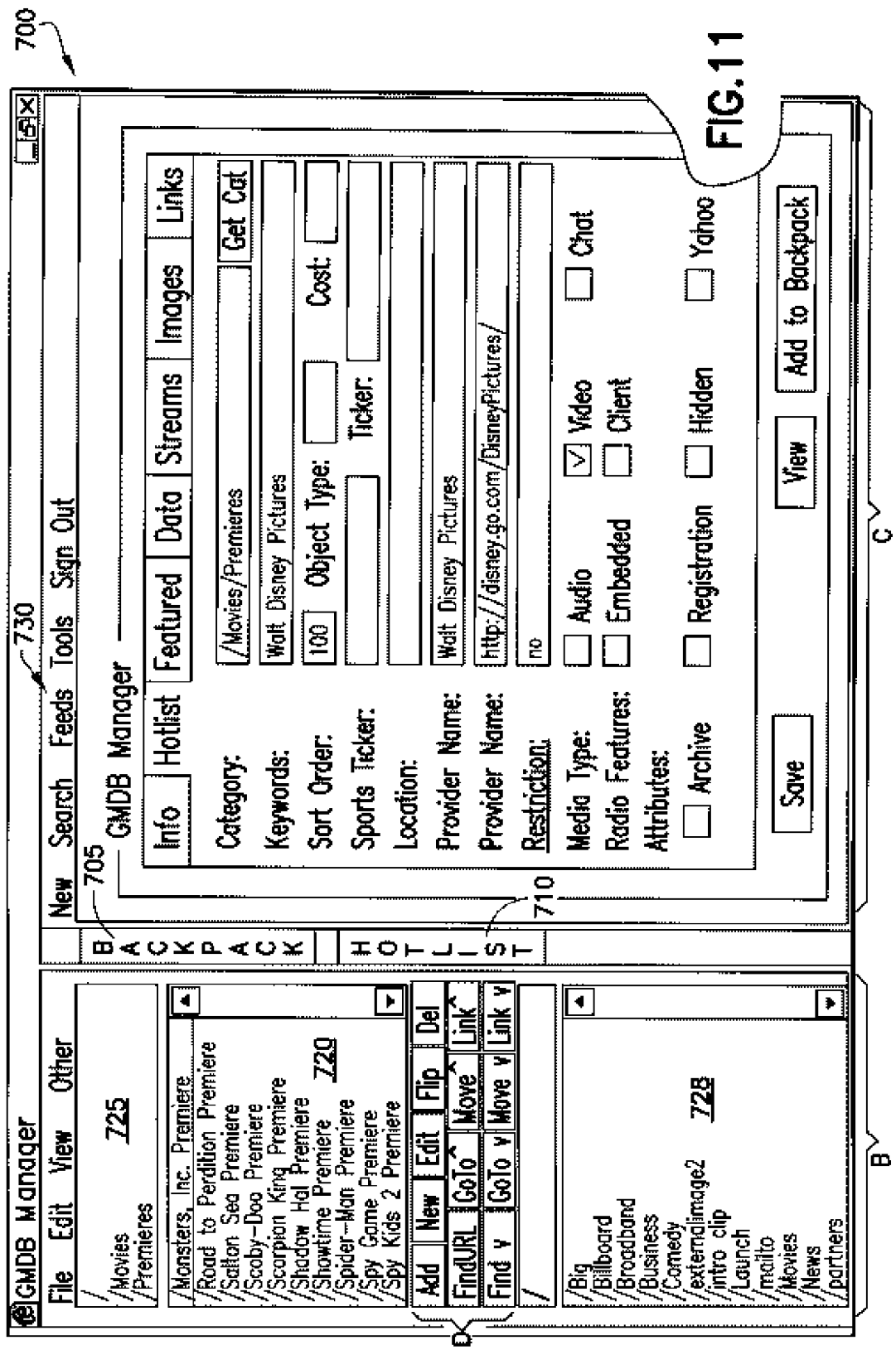

With reference to FIG. 11, the operation of the hotlist tab will now be described. The Hotlist tab allows the producer to add or modify the MEDIA TYPE, PLAYER FORMAT and STREAMING SPEED. The producer 150 can enter whether or not the event is a service provider created event, which means it will create a red "Y" icon, in the case of Yahoo! created content, on the site and launch the embedded content player. The producer can also select whether or not REGISTRATION is required to view the event. The producer can enter additional information such as KEYWORDS, CATEGORIES, SORT ORDER, OBJECT TYPE, COST, SPORTS TICKER, TICKER, LOCATION, PROVIDER NAME, PROVIDER URL, as well as additional attributes. It is understood that each feed file may contain more, less or all of the available tags that are used to define a feed file as described in FIG. 3.

Selecting the Hotlist tab reveals several data tags. For example, the CATEGORY field refers to the category of the selected content. Pressing the "Get Cat" button, will set the value of the category PATH tag to the current PATH displayed in a selected path window 725 at the top of the Hotlist Pane B. In the present embodiment, the category tag can be edited by selecting the category from a hierarchy sub window 720 using the "Get Cat" button. In operation, a producer will select the appropriate location in the Hotlist by either clicking or double-clicking an entry in a hierarchy sub window 720. A selected path window 725 appears directly above hierarchy sub window 720. In addition, clicking on the "Get Cat" button of the Hotlist tab enters the appropriate information in the category PATH tag. The field keywords contains information only if KEYWORDS are being added to increase the search functionality. As previously described, the SORT ORDER indicates where the items appear on the page. It is defaulted to 100. The COST field will contain a value if there is a cost to view the event. PROVIDER NAME is the source of the content. For example, Yahoo! Movies, ESPN, AOL, etc. will be displayed with the listing of the event. The provider URL is the URL for the specific provider if needed. The provider's name will then be a hot link linking to the provider's site.

For the Hotlist tab, if the event type is "category", then keywords, sports ticker, media, player format, player speed, Yahoo!, archive and registration will be grayed out.

Figure 12:
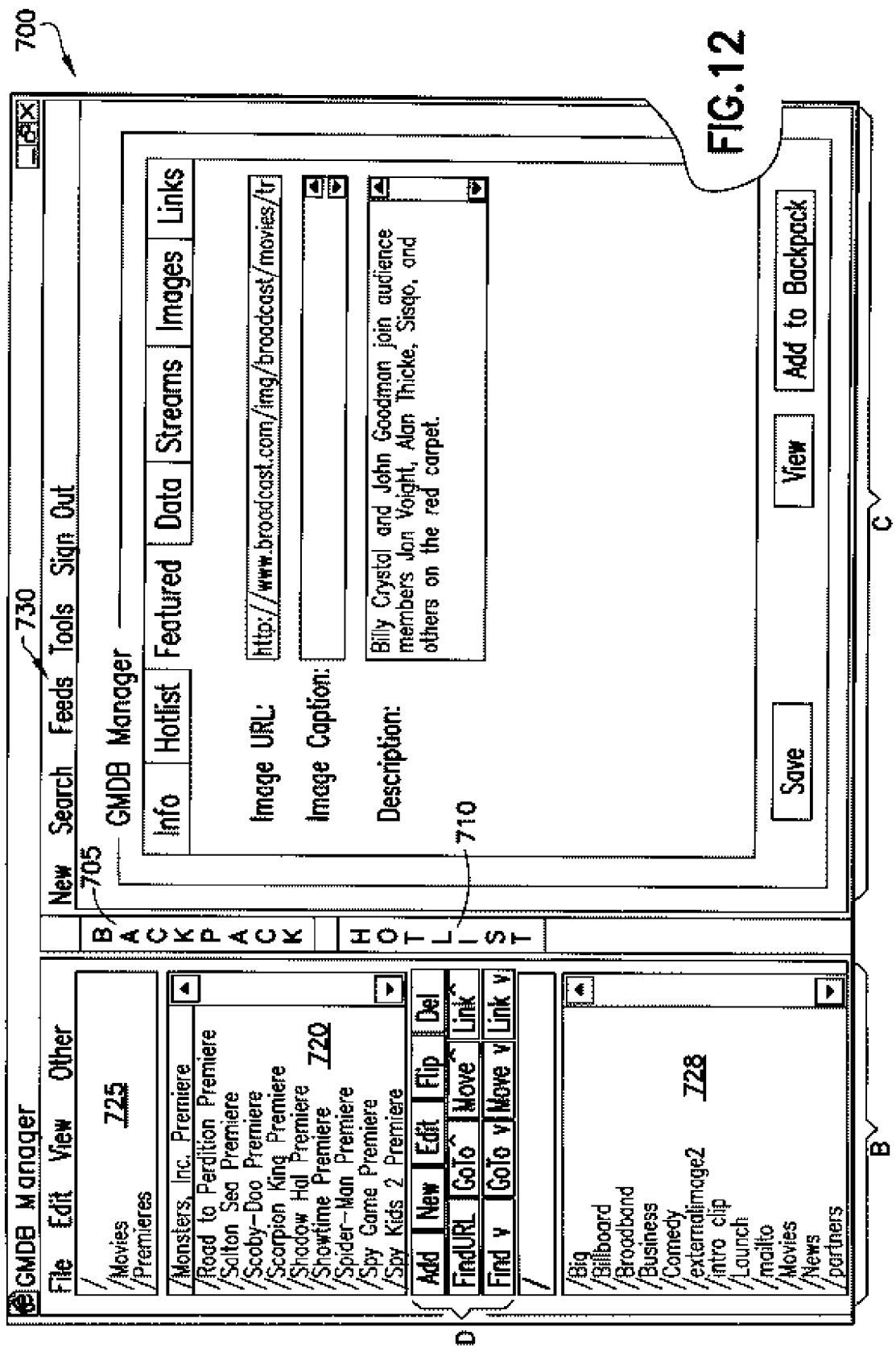

With reference to FIG. 12, the "Featured" tab permits promotion of featured listings. Here, information is entered so that the entry appears on the top levels of any list of results on the subscriber's web site for quick reference. The producer 150 can enter a different description than the one used in the HotList listing and can also add the IMAGE URL and IMAGE CAPTION. In an alternate embodiment, this tab may also contain information about the level of priority a featured listing will received based upon the amount of premium paid by the content provider or other criteria.

Figure 13:
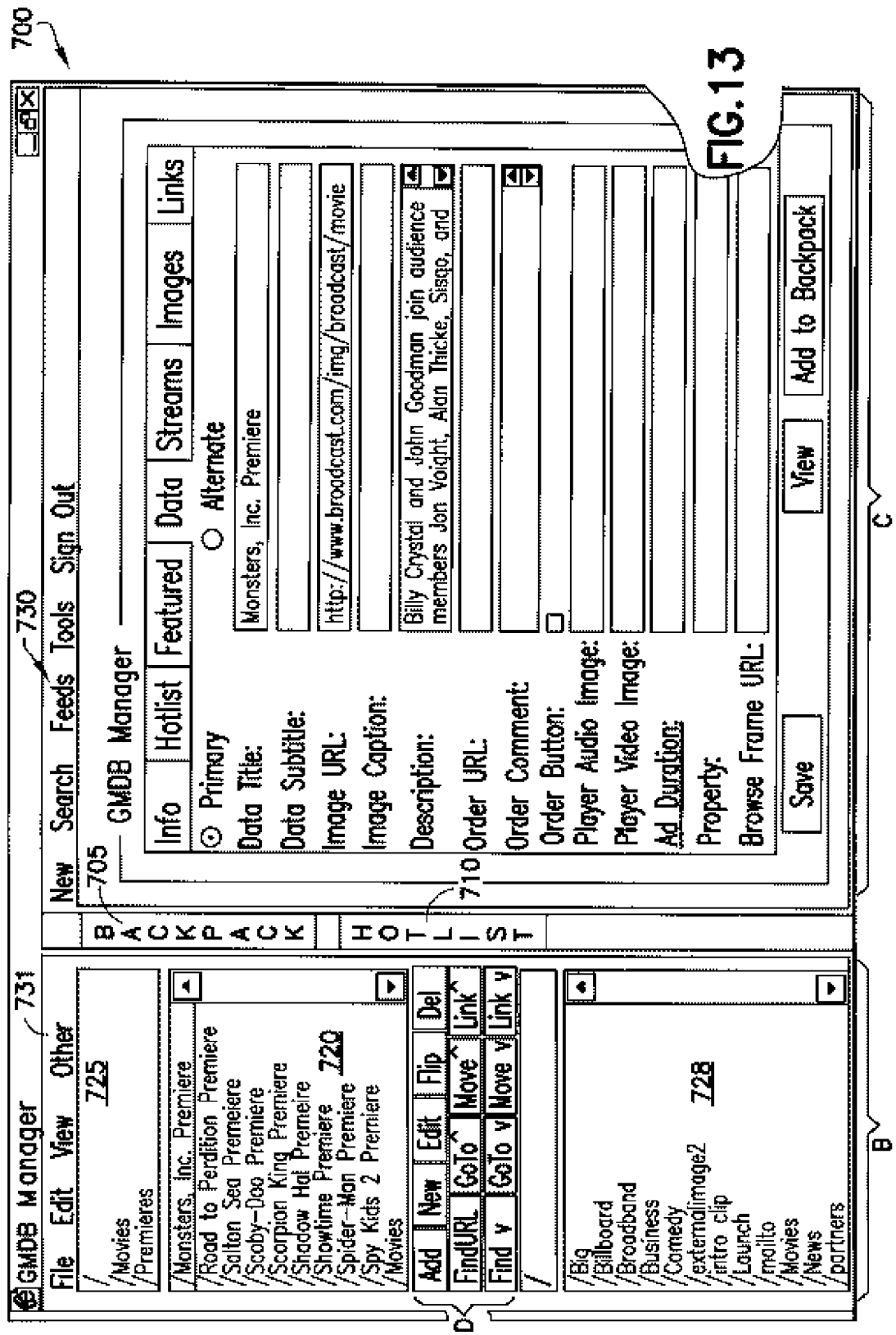

With reference to FIG. 13, the "Data" tab contains the information that will be used to build the data window in the embedded player for an event. This is only for service provider created content. Anything with a data window will create a red "Y" icon on the site, in the case of Yahoo! created content, which launches the embedded player. In addition, information about shopping can be entered if related shopping links to merchandise are available for purchase. The data window presents information to an end user using information contained in the feed file. The embedded player accesses the information in the feed file and presents the digital content to the end user.

A primary field is the main event title and it will show up in the data window. An alternate field is used for any data window that would not use the generic media player that is being used throughout the site. The alternate field functionality requires the producer to add a URL that points to a different media player program. The image URL is the URL that will be used on the data window while image CAPTION is a caption that would be used and displayed under the image. The Caption is used to give credit to the supplier of the image. The order button checkbox is used if the Shopping button should appear on the page. The order URL is a link to Shopping for that specific item.

In the Data tab, if the event type is category, leaf, or category leaf, all of the fields are disabled.

Figure 14:
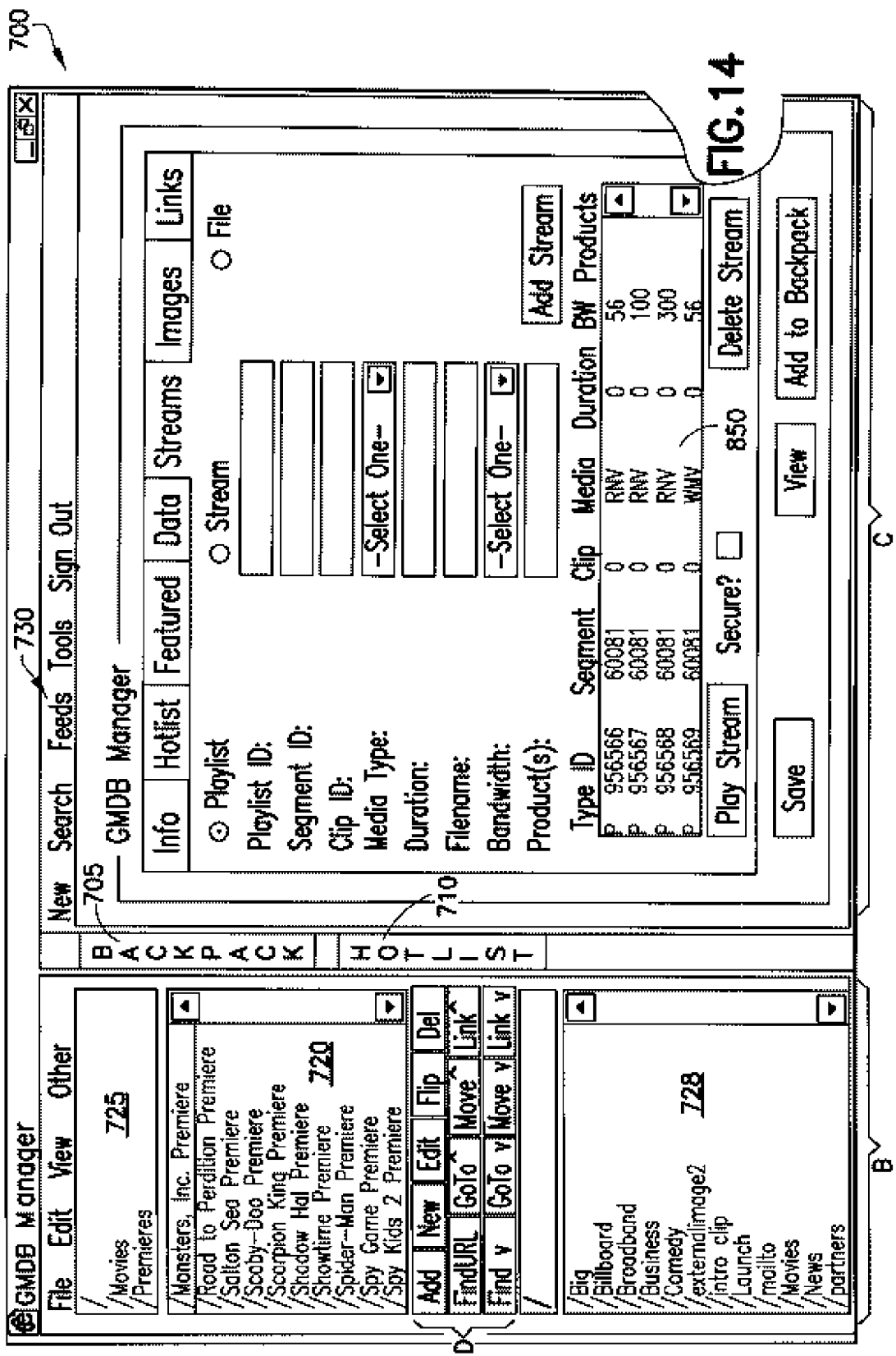

With reference to FIG. 14, the "Streams" tab contains information from the feed file 300 pertaining to the digital content of an event and permits the producer to select from at least three categories, playlist, stream, and file depending upon the type of content listed. In the Playlist option, the producer is able to enter information about the digital content such as the playlist ID, segment ID, clip ID, media type, duration, filename, and bandwidth, as previously described Selecting the Stream option presents the producer with a segment ID field, a clip ID field, a media type, a duration field, a file name, a bandwidth field, and a products tag. For either the Playlist or Stream Option, either the Playlist or the stream ID will be disabled. Selecting the File option disables the segment ID tag, and the clip ID tag. After the producer enters the appropriate data, the producer clicks the "add stream" button. The stream is then presented in a data sub window 850 at the bottom of the streams tab. A producer is then able to add multiple streaming media or other digital content with different ID's, segments, speed, and formats. The Media Type field presents the producer with a drop down menu wherein the producer may select the media FORMAT; for example, Windows Media Player, Real or QuickTime for either the Stream or the Playlist. In addition, a Bandwidth field drop down menu presents the producer with the actual SPEED of the streaming media being referenced. Below the data sub window 850 is a "play stream" button which will play the selected streaming content and a "delete stream" button which will remove a streaming media content added to the data sub window 850. As such, a feed file 300 may include multiple pieces of digital content (streaming media, files, and the like) for a particular event. Each piece of digital content is identified in data sub window 850 of Pane C when the Streams tab is selected. As new formats are added, the producer 150 can access the Streams tab and add new information for the additional content to the feed file 300, It is understood that in an alternate embodiment, the Streams tab could present categories in addition to Playlist, Stream, and File or present fewer categories as a matter of design choice and current software standards.

For the "Streams" tab, if the event type is category, leaf or category leaf, all of these fields will be disabled.

Figure 15:
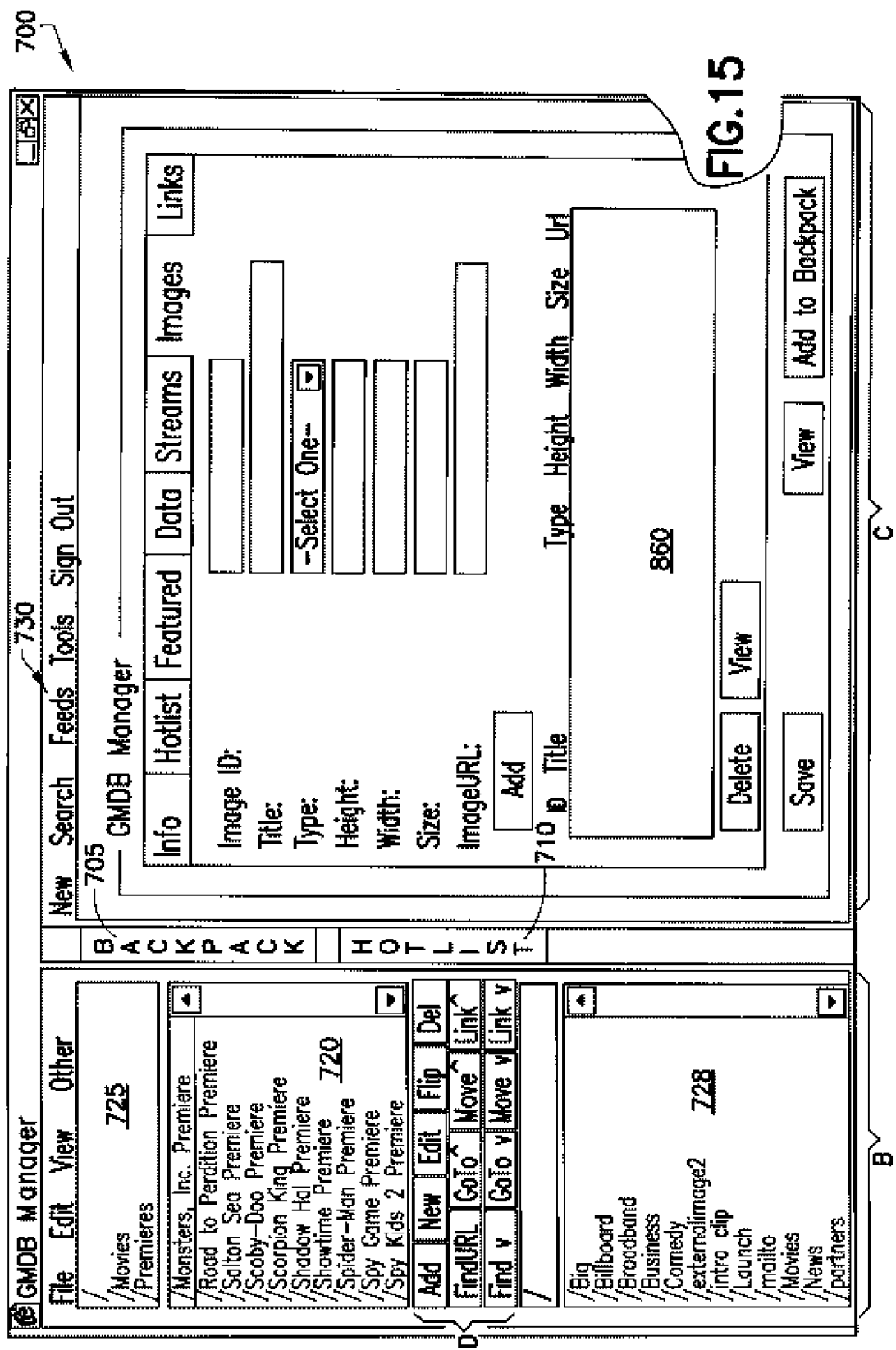

Next, FIG. 15 describes the "Images" tab where a producer 150 may associate an image file with the GMDB 110. While certain embodiments of the present invention are described with reference to streaming media, other alternate embodiments of the present invention may contain other digital content such as images or audio files, text files, software files and the like. Image tab contains fields with labels such as Image ID, Title, Type, Height, Width, Size, and Image URL that correspond to the actual elements and tags from feed file 300. Similar to the operation of the Streams tab, multiple images may be entered into a data sub window 860 by entering the appropriate information for the image and selecting the "add" button. In addition, the producer 150 may view an image by selecting a "view" button below a data sub window 860 or remove an image from data sub window 860 by selecting the "delete" button located below data window 860. The types of images that are supported may be a .GIF file, or a .JPG file. It is understood, that additional types of image formats may also be supported. In the present embodiment, any number of images in any format could be linked to this event and identified in the feed file.

Figure 16:
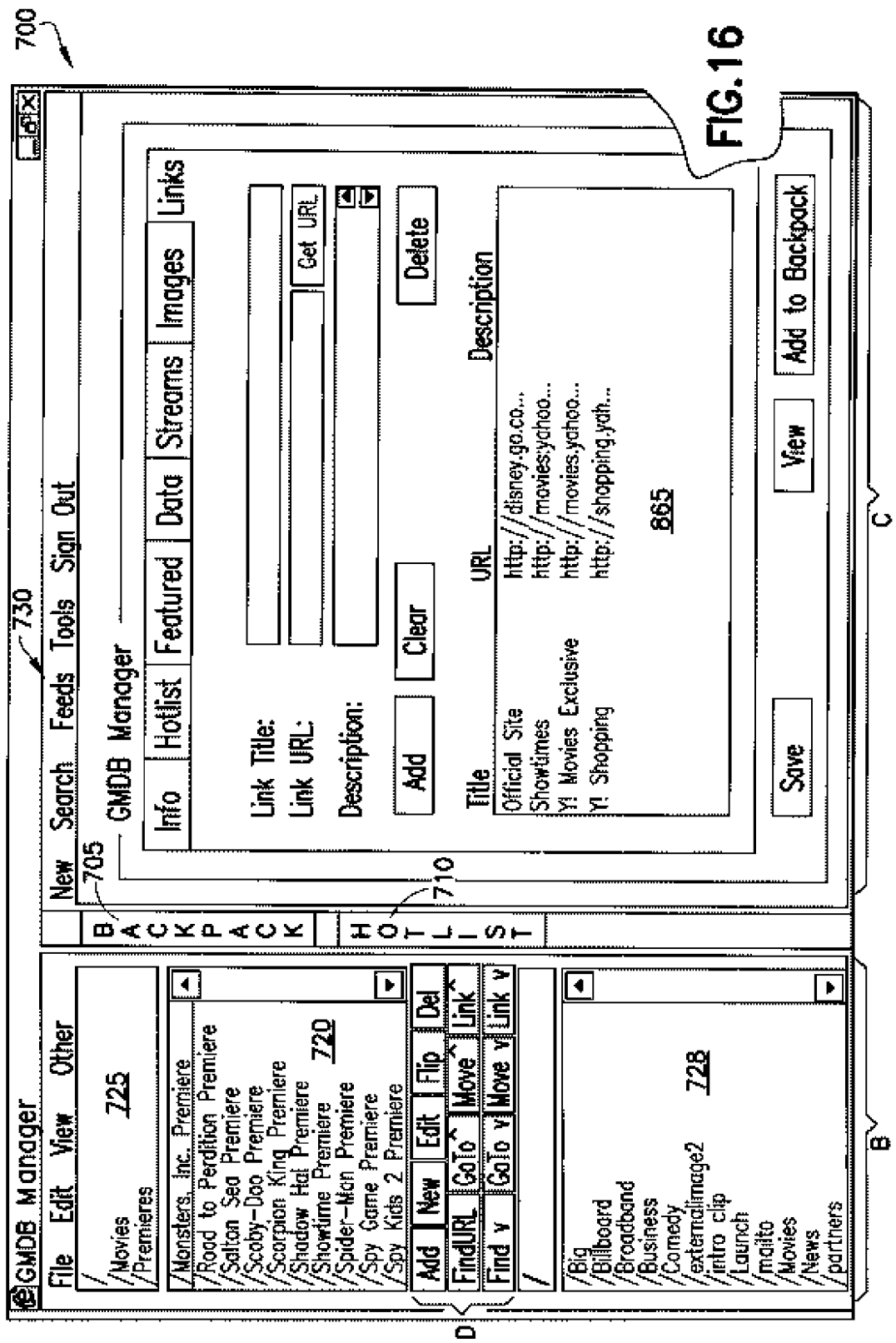

FIG. 16 describes the "Links" tab where producers may build related links that are part of the data window. These links appear in a data sub window 865. The following fields are presented: Link Title, Link URL, and Description that correspond to the element LINK and the accompanying tags. In addition, a "Get URL" button is included so that a producer 150 may enter the URL information directly from an associated web page. As with the previous tabs, multiple links may be stored by entering the appropriate data and selecting the "add" button. In addition, links may be removed from data sub window 865 by selecting the "delete" button.

If the event type is category, leaf, or category leaf, all of the fields are disabled.

Figure 17:
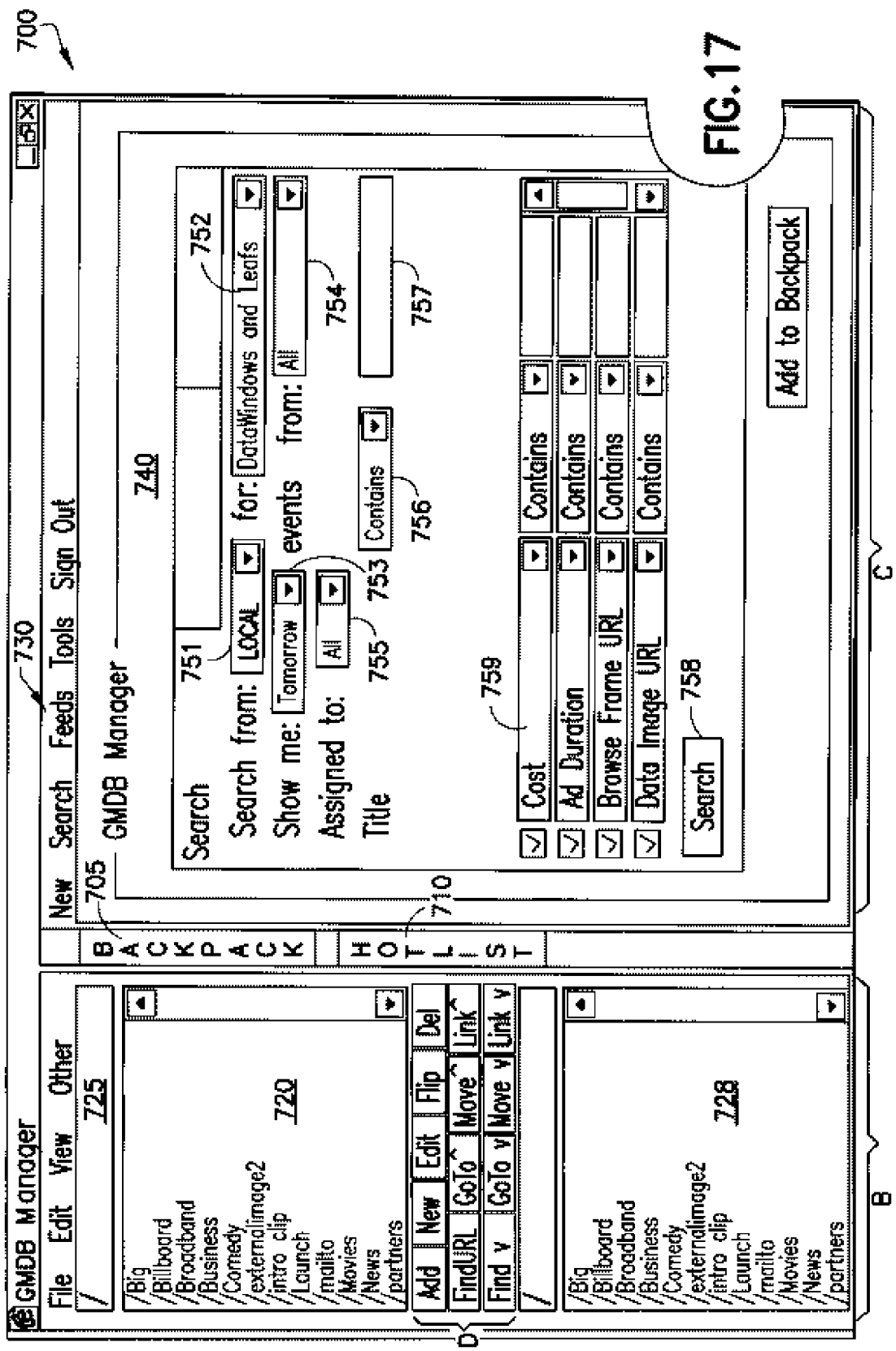
FIGS. 17-18 are screen shots of a graphical interface for searching in accordance with an embodiment of the present invention.
Figure 18:
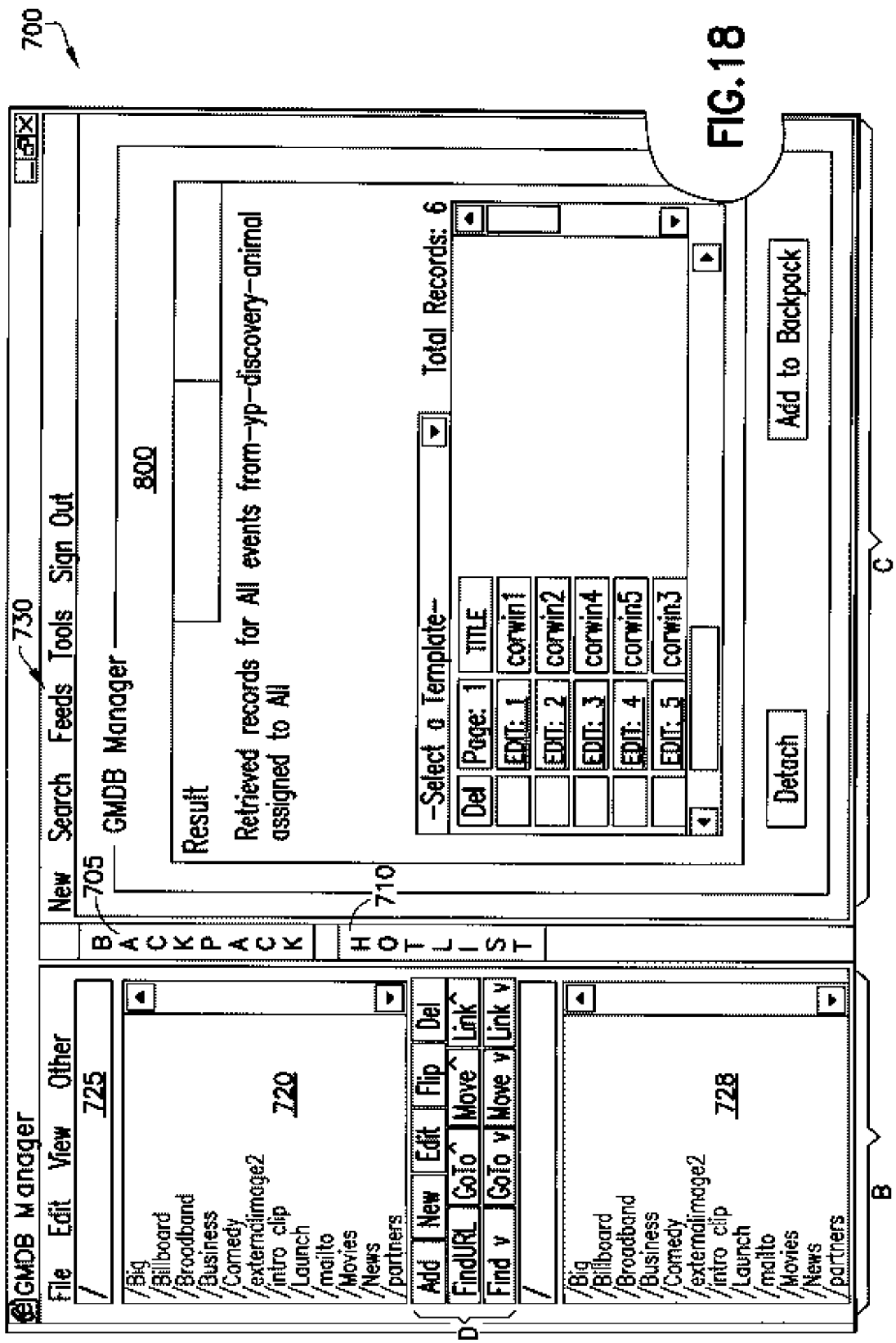

Turning now to FIGS. 17 and 18, there are shown screen shots of a graphical interface for searching for feed files according to an embodiment of the present invention. Selecting the search menu from Toolbar 730, reveals a search window 740. Search window 740 permits a producer 150 to search based on different criteria and may confine the search to an exact phrase or similar phrase and may also limit the search results to particular dates or date ranges. Window 740 contains several data fields including a location field 751 having a value of local, regional or national. Additional location descriptions may be used and entered in location field 751. A media type field 752 permits the producer to select new items, data windows and leaves, categories and category leaves, or all and accesses the TYPE tag from feed files 300. Next, the producer may show all the feed files from a particular time period displayed in a time period field 753. The producer may select from all, tomorrow's, this week's, today's or expired time periods. In addition, a category field 754 permits the producer to select from various categories contained in GMDB 110. The categories may contain, among other things, war coverage, racecars, sports, weather, etc. Next, an assignment field 755 permits a producer to select feed files that are either assigned to that particular producer or all feed files. Next, the producer may limit the title to certain terms by selecting a selector tag 756 such that text entered in a search field 757 is either contained in or is equal to the text of the feed file. Field 756 permits the producer to either select contains and/or is equal to so that the information contained in field 757 is found either in whole or in part in the title. It is understood that the fields described access the corresponding tags from the feed files 300 when preparing results that match the search criteria.

In another embodiment, one or more additional search criteria drop down menus 759 permit the producer to further refine the search using any of the XML tags in the feed file 300. Selecting one of the additional XML tags, reveals two additional fields similar to 756 and 757. As such, the producer is able to enter a textual value in field 757 and then select whether or not that value should either be equal to or be contained in the selected field 759. In addition, multiple search criteria may be entered in this manner. Once all relevant search criteria are entered, the producer selects a search button 758, whereupon GMDB access the feed files 300 and compares the values in the tags of each feed file with the desired search criteria. The results are then displayed to the producer 150 in Pane C similar to FIG. 18.

Referring to FIG. 18, there is shown a screen shot of a results page 800 for a search requesting "all" feed files for "all" events from the category "yp-discovery-animal" assigned to "ALL". A total of six feed files match the search criteria by the producer. For each feed file, the producer may select an edit link 805 to display the data for the particular feed file. The view would be similar to that shown in FIG. 10 wherein the plurality of tabs is displayed so that the producer could add, delete or modify the data contained in the selected feed file. It is understood that the information columns displayed in FIG. 18 can be customized to display additional information pertaining to the query results.

Once a search has been completed, a producer has two options. The search results can either be added to backpack or detached by selecting the appropriate buttons on the bottom of results page 800. Selecting the "add to backpack" button saves the search parameters that the producer has entered in the Backpack. This is helpful for commonly used searches and may be repeated at any time. The producer may also detach a search result from the specific search just performed. If a feed file is detached, the producer can then edit each of the remaining results.

Similar to the search screen of FIG. 18, selecting the "Feeds" menu from Toolbar 730 reveals two additional choices: "My Feeds" and "Other". Selecting "My Feeds" performs an automatic search to retrieve "ALL" events from "ALL" assigned categories assigned to the particular producer where the status is "new" or "updated". Using this feature, a producer is able to retrieve a list of all feed files assigned to that particular producer. By selecting the "other" feature from the feeds drop down menu, a new window opens that permits the producer to select from a feed file based on a feed provider "top level category" and "category".

In a certain embodiment, regardless of the changes made to content from any of the feed files, the following information will flow through and not require producer 150 approval: stop and end time, stop and end date, year, time zone for the event, URL, registration, media, byte rates, formats and contact names and e-mails. A change to any other category requires the producer 150 to either accept or modify the proposed changes and save them.

It is understood that the feeds menu may be modified to include additional feed files, such as those submitted from additional content providers.

Selecting "preferences" under the tools menu from toolbar 730 permits the producer to set as defaults certain preferences when conducting a search. In addition, the producer 150 can set preferences for how a listing of streams is displayed and what columns are displayed, and how the GMDB manager appears visually. One of the producers selects the search menu from toolbar 730, certain search criteria are set as default. Referring to FIG. 17, it is clear that the producer's default setting was to search initially on "title". While a producer may add additional search criteria through field 759 the default search criteria are stored and selected under "tools" and "preferences".

Figure 19:
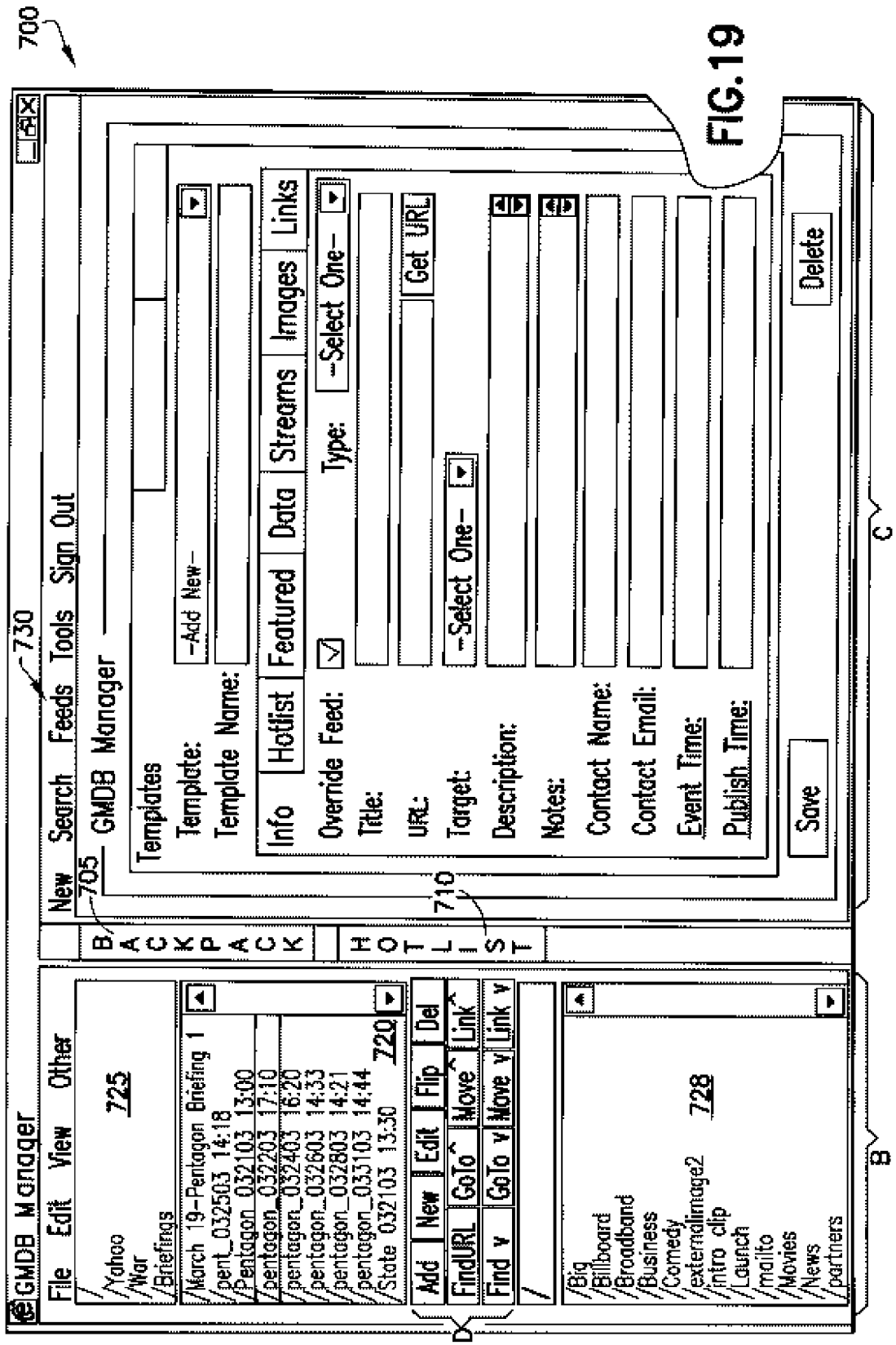
FIG. 19 is a screen shot of a graphical interface for applying a template in accordance with an embodiment of the present invention.

Referring now to FIG. 19, there is shown a screen shot of a logical representation of a template in a template window 900, which is accessed by selecting "templates" under the tools drop down menu on toolbar 730. A template stores various information that is either required to be entered in the feed file 300 or is written to the feed file 300 upon submission to the GMDB 110. Alternatively, a template can be viewed as a set of absolute or conditional rules. Whenever a feed file is submitted to GMDB 100, one or more templates are applied to the incoming feed file. These templates can be applied based upon category, content provider ID, URL, and the like. In an embodiment of the invention, if information in a particular feed file is present in the corresponding tags of the template, the feed file could be automatically approved and listed in GMDB 110. In yet another embodiment, the template could only require that as long as an entry is listed in each tag required by the template, the feed file could be approved and listed. For example, feed files from sport content providers may be required by a template to include a team sports ticker. Regardless of the value contained in the feed file, the feed may be approved if the tag SPORTS TICKER CONTAINS a value. In another embodiment, the content of the SPORTS_TICKER tag could be looked up on a database stored within GMDB 110 to confirm that an approved value is entered.

When creating a feed file, there is a data field labeled "override feed" which permits the producer 150 to override the data from the incoming feed file and replace it with information contained in the template. This feature allows the producer to produce uniform feed files for a particular category or content provider, etc.

The template field at the top of window 900 may default to the phrase "add new". If this value is selected, then the producer 150 may enter a template name in the template name field directly below. If the producer uses the drop down menu for the template field, a list of all previously established templates is displayed. If the producer selects one of these previously stored templates, the information contained within that template is populated throughout the tags and may be edited by the producer.

Selecting the "apply template" menu from the "tools" drop down menu on toolbar 730 permits the producer to add a new feed file for an event containing all of the information previously stored in a template. This feature is used if a producer is adding a new feed file from the same source. The template may be customized for each content provider, each category that the event belongs to and for the individual event. It is understood that templates could be designed for a variety of criteria and is not limited to the uses described above. In addition, the templates may be particular to the individual producer 150, global among all producers 150 or any combination thereof.

Those skilled in the art will recognize that the method and system of the present invention has many applications, may be implemented in many manners and, as such, is not to be limited by the foregoing exemplary embodiments and examples. In this regard, any number of the features of the different embodiments described herein may be combined into one single embodiment. Moreover, the scope of the present invention covers conventionally known and future developed variations and modifications to the system components described herein, as would be understood by those skilled in the art.

What is claimed is:

1. A method comprising:
    receiving, via at least one server computer and from a plurality of content providers providing digital content, incoming feed files, each feed file comprising descriptive information describing the digital content and a plurality of data elements associated with the descriptive information;
    receiving, via the at least one server computer, request files from a plurality of subscribers, each request file comprising at least one search criteria for the data elements associated with the descriptive information describing the digital content;
    identifying, via the at least one server computer, at least one of said feed files based on the search criteria, said identifying comprising determining a match between the search criteria and the data elements associated with the descriptive information of the feed files;
    compiling, via the at least one server computer, an answer file comprising the identified feed files with descriptive information describing respective digital content corresponding to the search criteria; and
    transmitting, via the at least one server computer, the answer file to the subscribers, said transmission usable by the subscribers to access the digital content described in the identified feed files compiled in the answer file.

2. The method of claim 1, further comprising:
    receiving additional descriptive information from a producer, the additional information corresponding to a description of the feed files.

3. The method of claim 2, wherein the additional information further comprises information correlating the digital content of the feed files to a broadcast event, the information identifies a media format and transfer rate of the feed files.

4. The method of claim 3, wherein the format of the plurality of feed files being an XML document.

5. The method of claim 3, wherein the format of the plurality of feed files being a HTTP document.

6. The method of claim 1, wherein the data elements of the digital content relate to a broadcast event.

7. The method of claim 6, wherein each of the data elements associated with the descriptive material comprise corresponding information tags, the information tags identify the broadcast event, a provider of the feed files and each of the data elements.

8. The method of claim 7, wherein the information tags further describe characteristics of material reference in the feed files.

9. The method of claim 7, wherein the information tags further comprise information corresponding to the rendering of the feed files contained within the answer file.

10. The method of claim 1, wherein said transmitting further comprising:
    distributing the answer file based on load balancing weighting methods.

11. A computer readable non-transitory medium tangibly encoded with instructions for performing a method comprising:
    receiving, from a plurality of content providers providing digital content, incoming feed files, each feed file comprising descriptive information describing the digital content and a plurality of data elements associated with the descriptive information;
    receiving request files from a plurality of subscribers, each request file comprising at least one search criteria for the data elements associated with the descriptive information describing the digital content;
    identifying at least one of said feed files based on the search criteria, said identifying comprising determining a match between the search criteria and the data elements associated with the descriptive information of the feed files;
    compiling an answer file comprising the identified feed files with descriptive information describing respective digital content corresponding to the search criteria; and
    transmitting the answer file to the subscribers, said transmission usable by the subscribers to access the digital content described in the identified feed files compiled in the answer file.

12. The computer readable non-transitory medium of claim 11, further comprising:
    receiving additional descriptive information from a producer, the additional information corresponding to a description of the feed files.

13. The computer readable non-transitory medium of claim 12, wherein the additional information further comprises information correlating the digital content of the feed files to a broadcast event, the information identifies a media format and transfer rate of the feed files.

14. The computer readable non-transitory medium of claim 13, wherein the format of the plurality of feed files being an XML document.

15. The computer readable non-transitory medium of claim 13, wherein the format of the plurality of feed files being a HTTP document.

16. The computer readable non-transitory medium of claim 11, wherein the data elements of the digital content relate to a broadcast event.

17. The computer readable non-transitory medium of claim 16, wherein each of the data elements associated with the descriptive material comprise corresponding information tags, the information tags identify the broadcast event, a provider of the feed files and each of the data elements.

18. The computer readable non-transitory medium of claim 17, wherein the information tags further describe characteristics of material reference in the feed files.

19. The computer readable non-transitory medium of claim 17, wherein the information tags further comprise information corresponding to the rendering of the feed files contained within the answer file.

20. The computer readable non-transitory medium of claim 11, wherein said transmitting further comprising:
    distributing the answer file based on load balancing weighting methods.

* * * * *